United States Patent
Tahaliyani et al.

(10) Patent No.: US 9,692,824 B1
(45) Date of Patent: Jun. 27, 2017

(54) METHODS AND APPARATUS FOR PROVIDING ISOLATION ZONES IN A CLOUD COMPUTING ENVIRONMENT

(71) Applicants: Seema Tahaliyani, Allen, TX (US); Sukesh Kumar Biddappa, Murphy, TX (US); Alexander Hoppe, Medford, MA (US); Vladislav Dranov, Irving, TX (US); Jeffrey B. Gibson, Lane Frisco, TX (US)

(72) Inventors: Seema Tahaliyani, Allen, TX (US); Sukesh Kumar Biddappa, Murphy, TX (US); Alexander Hoppe, Medford, MA (US); Vladislav Dranov, Irving, TX (US); Jeffrey B. Gibson, Lane Frisco, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 460 days.

(21) Appl. No.: 13/628,661

(22) Filed: Sep. 27, 2012

(51) Int. Cl.
| | | |
|---|---|---|
| *H04L 29/08* | (2006.01) | |
| *H04L 29/06* | (2006.01) | |
| *H04L 12/24* | (2006.01) | |

(52) U.S. Cl.
CPC .......... *H04L 67/1097* (2013.01); *H04L 29/06* (2013.01); *H04L 29/08072* (2013.01); *H04L 41/0213* (2013.01)

(58) Field of Classification Search
CPC .. G06F 15/177; G06F 15/173; G06F 21/6218; G06F 17/30; G06F 13/14; G06F 9/5072; G06F 8/61; G06F 9/44505; H04L 41/00; H04L 12/24; H04L 12/4641; H04L 12/4645; H04L 49/90; H04L 12/467; H04L 12/46; H04L 29/08549; H04L 41/22; H04L 12/28; H04L 41/0213; H04L 29/08072; H04L 29/06; H04L 41/12; H04L 12/2602; H04L 29/0809; H04L 29/08144; H04L 63/08
USPC .......................................... 709/223; 370/254
See application file for complete search history.

(56) References Cited

U.S. PATENT DOCUMENTS

| | | | |
|---|---|---|---|
| 7,643,468 B1 * | 1/2010 | Arregoces ............. | H04L 12/462 370/351 |
| 8,588,225 B1 * | 11/2013 | Ganesan et al. ............... | 370/389 |
| 2004/0210623 A1 * | 10/2004 | Hydrie et al. ................ | 709/201 |
| 2005/0071454 A1 * | 3/2005 | Ellis ........................ | H04W 4/24 709/223 |

(Continued)

OTHER PUBLICATIONS

Vblock Infrastructure Platforms Series 300 Architecture Overview, Version 2,4, Aug. 2011, The Virtual Computing Environment Company, www.vce.com. 74 pages.

(Continued)

*Primary Examiner* — Anthony Mejia
*Assistant Examiner* — Mehulkumar Shah
(74) *Attorney, Agent, or Firm* — Daly, Crowley, Mofford & Durkee, LLP

(57) ABSTRACT

Methods and apparatus to create with user input a first isolation zone in a block in a cloud computing environment, the block comprising first and second VSANs, a virtualization management VLAN, a file storage VLAN, and identity pools. The isolation zone can be applied to one or more services. The user can achieve a desired isolation between block components, such as VSANs and/or VLANs, in services.

18 Claims, 25 Drawing Sheets

(56) References Cited

U.S. PATENT DOCUMENTS

| | | | |
|---|---|---|---|
| 2006/0251111 A1* | 11/2006 | Kloth et al. | 370/464 |
| 2007/0130295 A1* | 6/2007 | Rastogi | H04L 41/0816 709/220 |
| 2007/0156877 A1* | 7/2007 | Krishnan | H04L 29/1232 709/223 |
| 2008/0123559 A1* | 5/2008 | Haviv | G06F 8/61 370/255 |
| 2013/0067066 A1* | 3/2013 | Dickens et al. | 709/224 |
| 2014/0059187 A1* | 2/2014 | Rosset et al. | 709/220 |

OTHER PUBLICATIONS

Cisco Unified Computing System and EMC VNXe3300 Unified Storage System, White Paper, Jan. 2011, Revision 1.0, $EMC^2$, Cisco Systems, Inc., 170 West Tasman Drive, San Jose, CA 95134-1706, www.cisco.com, 9 pages.

EMC Integrated Infrastructure for VMware Enabled by EMC VNXe3100 and VMware vSphere 4.1, An Architectural Overview, White Paper, EMC Global Solutions, $EMC^2$, Feb. 2011, 24 pages.

VMware vStorage APIs for Array Integration with EMC VNX Series for NAS, Benefits of EMC VNX for File Integration with VMware VAAI, White Paper, EMC Solutions Group, Jan. 2012, $EMC^2$, 17 pages.

Vblock™ Infrastructure Platforms 2010 Vblock Platforms Architecture Overview, Version 1.3, Nov. 2011, The Virtual Computing Environment Company, www.vce.com, 25 pages.

Best Practices for Deploying VMware vCloud Director on Vblock Infrastructure Platforms, Sep. 2011, The Virtual Computing Environment Company, www.vce.com, 20 pages.

Service Catalog Strategies for Vblock™ Infrastructure Platforms, IaaS COE, Jan. 2011, The Virtual Computing Environment Company, www.vce.com, 19 pages.

Unified Infrastructure Manager/Provisioning, © 2011 VCE Company, The Virtual Computing Environment Company, www.vce.com, 3 pages.

Vblock™ Infrastructure Platforms Technical Overview, © 2011 VCE Company, The Virtual Computing Environment Company, www.vce.com, 8 pages.

Vblock™ Solutions for Trusted Multi-Tenancy: Technical Overview, Aug. 2011, The Virtual Computing Environment Company, www.vce.com, 75 pages.

U.S. Appl. No. 13/435,049, filed Mar. 30, 2013, 88 pages.

Notice of Allowance and Fee(s) Due in U.S. Appl. No. 13/435,049 dated Jan. 31, 2014, 10 pages.

* cited by examiner

Provisioning v3.2

| Service Manager | Administration |

Network Profiles   Service Offerings   Identity Pools   vCenter Instances   vCloud Instances Edit Isolation Zone Name: Burger Chain 3
Description:
⦿ Local  ○ Global

| | | Applicable Vblocks — 2000 |
|---|---|---|
| VSAN Path Type | | |
| VSAN A ID | 3100 ▶ | Mesh176 |
| VSAN B ID | 3101 ▶ | Volt |
| ESX Management VLAN | 84 ▶ | — 2002 |
| NFS VLAN | ▶ | |
| NFS IP Pool | ▶ | |

OK  Cancel

Services
Name

*FIG. 20*

METHODS AND APPARATUS FOR PROVIDING ISOLATION ZONES IN A CLOUD COMPUTING ENVIRONMENT

BACKGROUND

As is known cloud computing infrastructure systems contain a varied collection of servers ("hosts"), storage systems ("storage arrays"), networking devices, software modules and other components. Sets of hosts, networking devices, and storage arrays assembled in close proximity make up a unit of cloud infrastructure. These components are physically connected via Ethernet networks.

The logical configuration of these components and networks creates platforms that are sold or leased as services from a menu of predefined configuration offerings ("service offerings") for consumers of cloud computing. The instantiation of such an offering is considered an "infrastructure service". Defining services in this manner enables the consumer to use a selected portion of the host and storage resources within a given cloud infrastructure.

When configuring a computer system ("host") to communicate with a storage array ("array") across a fabric using the Fibre Channel protocol, it is common to configure 'zones' as a security measure to control which hosts are able to communicate with which arrays. The key in zoning are VSANs. VSANs combined with hardware-enforced zoning provide the SAN designer with new tools to highly optimize SAN deployments in terms of scalability, availability, security and management. VSANs provide the ability to create completely isolated fabric topologies, each with its own set of fabric services, on top of a scalable common physical infrastructure. As each VSAN possesses its own zoning service, zoning is then configured within each VSAN independently and has no affect on any other VSAN and zoning service.

Sets of hosts, networking devices, and storage arrays assembled in close proximity make up a unit of cloud infrastructure sometimes referred to as a pod ("pod") of devices. The pod components are physically connected via Ethernet networks.

SUMMARY

Exemplary embodiments of the invention provide methods and apparatus for creating isolation zones using user input. With this arrangement, the user can provide isolation between first and second services in a cloud computing environment. For example, a user can create first and second isolation zones that have isolated VSANs for competing entities. While exemplary embodiments of the invention are shown and described in conjunction with illustrative configurations, components, and applications, it is understood that embodiments of the invention are applicable to virtualized systems in general in which isolation zones are desirable.

In one aspect of the invention, a method comprises creating, using a computer processor, a first isolation zone in a block, wherein the block comprises: first and second VSANs, a virtualization management VLAN, a file storage VLAN, and identity pools, receiving user input for at least a first one of the first and second VSANs and the virtualization management VLAN, applying the first isolation zone to a service, and creating a second isolation zone with input from the user, the second isolation zone having third and fourth VSANs that are different from the first and second VSANs to provide isolation of data paths in the first and second isolation zones.

The method can further include one or more of the following features: the input from the user includes values for the first and second VSANs, the input from the user include a value for the virtualization management VLAN, the virtualization management VLAN for the first and second isolation zones is the same, applying the first isolation zone to a further service, determining a list of applicable blocks which contain the VSANs and VLANs used in the first isolation zone, determining isolation zones that are valid for the list of applicable blocks, validating connectivity between components in the block, receiving input from the user for the file storage VLAN in the first isolation zone, and/or receiving input from the user for the identity pool in the first isolation zone.

In another aspect of the invention, an article comprises: a computer readable medium comprising non-transitory stored instructions that enable a machine to perform: creating a first isolation zone in a block, wherein the block comprises: first and second VSANs, a virtualization management VLAN, a file storage VLAN, and identity pools, receiving user input for at least a first one of the first and second VSANs and the virtualization management VLAN, applying the first isolation zone to a service, and creating a second isolation zone with input from the user, the second isolation zone having third and fourth VSANs that are different from the first and second VSANs to provide isolation of data paths in the first and second isolation zones.

The article can further include instructions for one or more of the following features: the input from the user includes values for the first and second VSANs, the input from the user include a value for the virtualization management VLAN, the virtualization management VLAN for the first and second isolation zones is the same, applying the first isolation zone to a further service, determining a list of applicable blocks which contain the VSANs and VLANs used in the first isolation zone, determining isolation zones that are valid for the list of applicable blocks, validating connectivity between components in the block, receiving input from the user for the file storage VLAN in the first isolation zone, and/or receiving input from the user for the identity pool in the first isolation zone.

In a further aspect of the invention, a system comprises: at least one processor, memory coupled to the at least one processor, the at least one processor and the memory configured to: create a first isolation zone in a block, wherein the block comprises: first and second VSANs, a virtualization management VLAN, a file storage VLAN, and identity pools, receive user input for at least a first one of the first and second VSANs and the virtualization management VLAN, apply the first isolation zone to a service, and create a second isolation zone with input from the user, the second isolation zone having third and fourth VSANs that are different from the first and second VSANs to provide isolation of data paths in the first and second isolation zones.

BRIEF DESCRIPTION OF THE DRAWINGS

The foregoing features of this invention, as well as the invention itself, may be more fully understood from the following description of the drawings in which:

FIG. 15B is a screen display showing service creation from a service offering;

FIG. 19 is an exemplary screen display showing vblock information;

FIG. 20 is an exemplary screen display showing isolation zone information that can be entered by a user;

DETAILED DESCRIPTION

Figure 1:
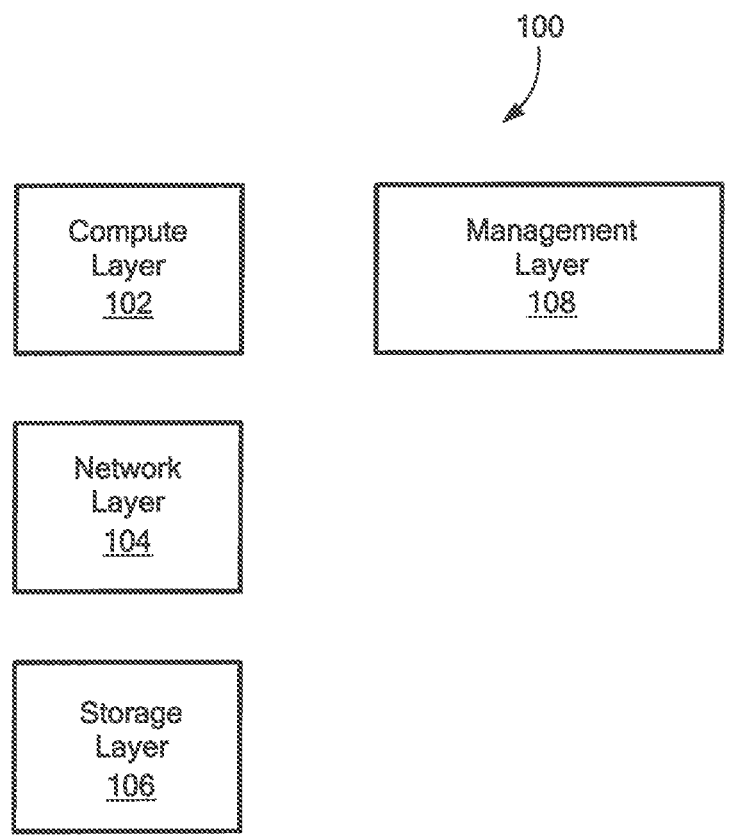
FIG. 1 is a high level schematic representation of a cloud storage system having isolation zones in accordance with exemplary embodiments of the invention.

FIG. 1 shows an exemplary cloud storage environment 100 having a compute layer 102, a network layer 104, a storage layer 106, and a management layer 108 having zone isolation in accordance with exemplary embodiments of the invention. The environment may be referred to as a platform. It is understood that any practical number of platforms can be combined into a cloud storage environment.

The compute layer 102 comprises components, such as blade servers, chassis and network interconnects that provide the computing power for the platform. The storage layer 106 comprises the storage components for the platform. The network layer 104 comprises the components that provide switching and routing between the compute and storage layers 102, 106 within and between platforms, and to the client or customer network.

Figure 2:
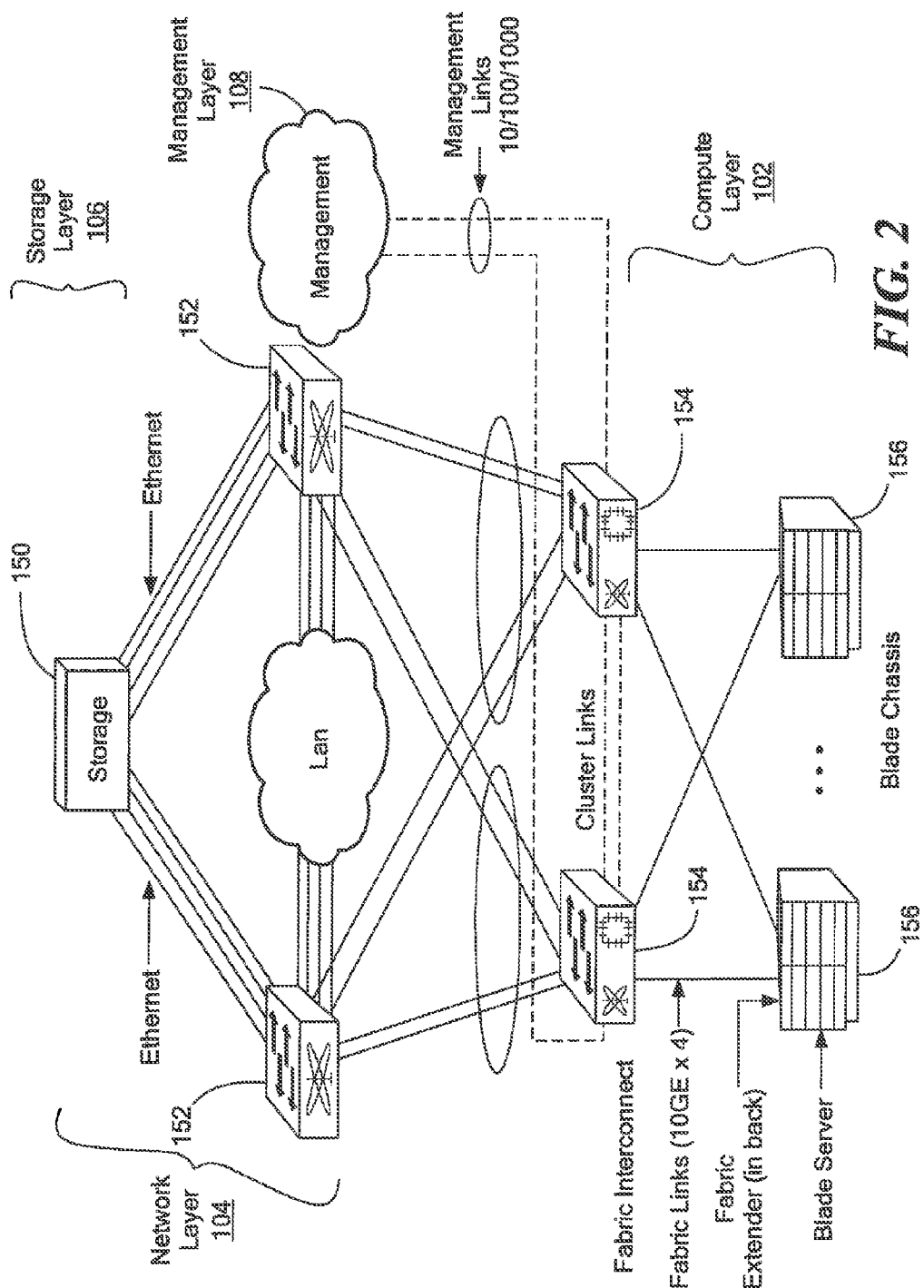
FIG. 2 is a schematic representation showing further detail of the cloud storage system of FIG. 1.

FIG. 2 shows further detail for the environment 100 of FIG. 1. The storage layer 106 can include storage components 150, such as CLARIION storage components from EMC Corporation of Hopkinton Mass. The network layer 104 can include a pair of switches 152, such as Nexus 5000 Series Ethernet Switches from Cisco of San Jose, Calif., coupled to the storage components and to a LAN. The compute layer 102 can include a pair of fabric interconnects 154, such as CISCO 6100 series devices. The compute layer can further include a number of blade servers 156, such as CISCO 5100 blade chassis. The management layer 108 can be coupled to the compute layer 102.

Figure 3:
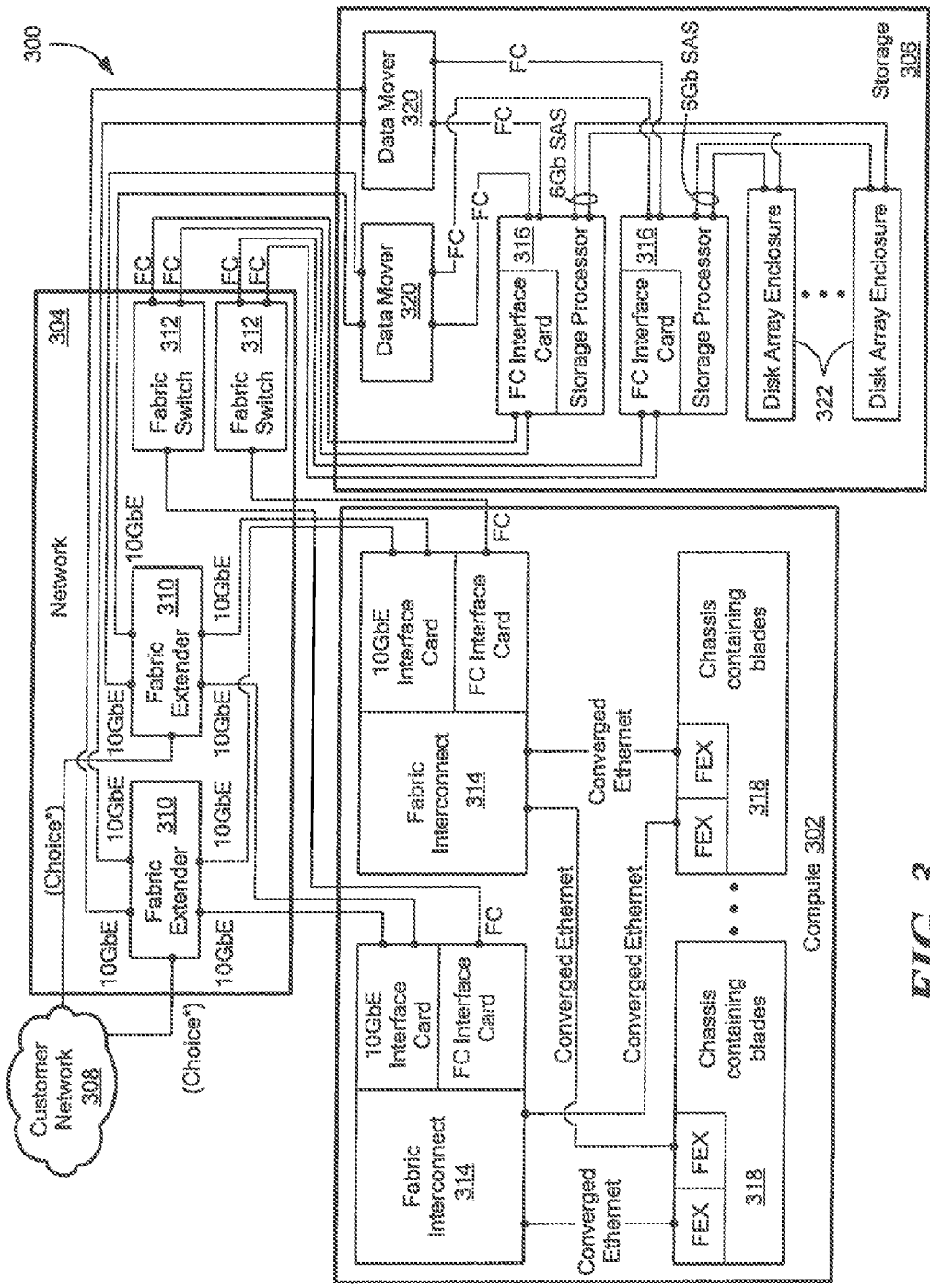
FIG. 3 is a schematic representation showing further detail of the cloud storage system if FIG. 2.
Figure 4:
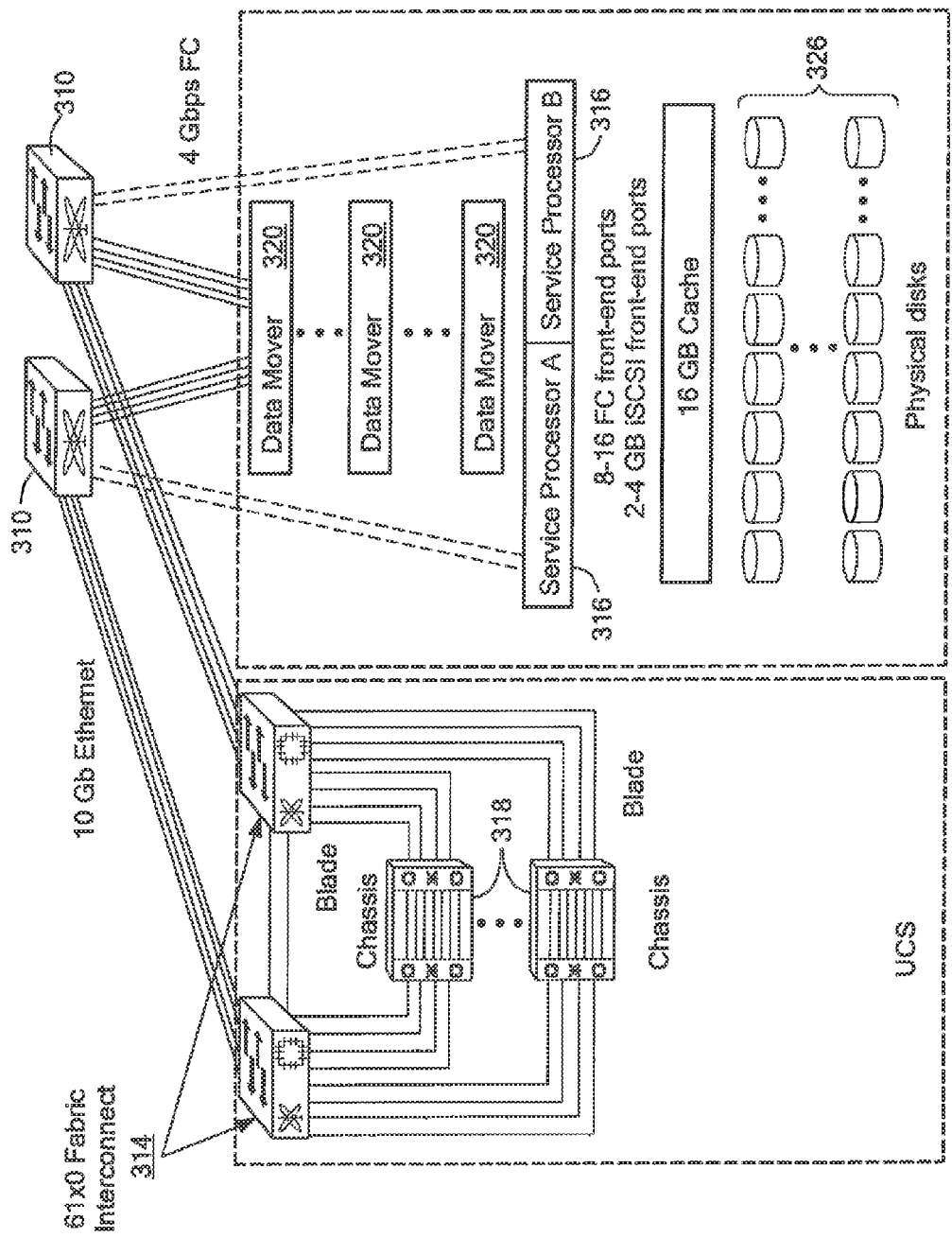
FIG. 4 is a schematic representation showing further detail of a storage layer of the cloud storage system of FIG. 3.

FIG. 3 shows further detail of an exemplary cloud environment having a compute layer 302, a network layer 304 and a storage layer 306. The network layer 302 is coupled to a customer network 308 in a manner known in the art. The network layer 302 includes switches 310 coupled to the customer network 308. The network layer 302 also includes multilayer fabric switches 312 coupled to fabric interconnects 314 in the compute layer 302 and to storage processors 316 in the storage layer 306. The fabric interconnects 314 are coupled to blade server chassis 318 containing blades. Data movers 320 in the storage layer 306 are coupled between the storage processors 316 and the switches 310 in the network layer. Disk array enclosures 322 are coupled to the storage processors 316. FIG. 4 shows interconnections for a system similar to that shown in FIG. 3 with physical disks 326. In the illustrated embodiment, the storage layer includes 8 to 16 front end fibre channel ports and 2-4 GB iSCSI front end ports and 2 to 4 Data Mover compute notes containing Ethernet adaptors.

It is understood that a variety of other configurations having different interconnections and storage configuration can be provided to meet the needs of a particular application.

The management layer can include a number of applications to perform various functions for overall control, configuration, etc. of the various platform components. For example, management applications can include a virtualization function, such as vSphere/vCenter, by VMware of Palto Alto, Calif. A further management application can be provided as part of the Unified Computing System (UCS) by Cisco. It is understood that the blade chassis and fabric interconnection can be considered part of the UCS. Another management application can includes a management interface, such as EMC Unisphere, to provide a flexible, integrated experience for managing existing storage systems, such as CLARIION and CELERRA storage devices from EMC. A further management application includes a platform element manager, such as unified infrastructure manager (UIM) by EMC, for managing the configuration, provisioning, and compliance of the platform.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed mean a generic product, function, or module.

Figure 5:
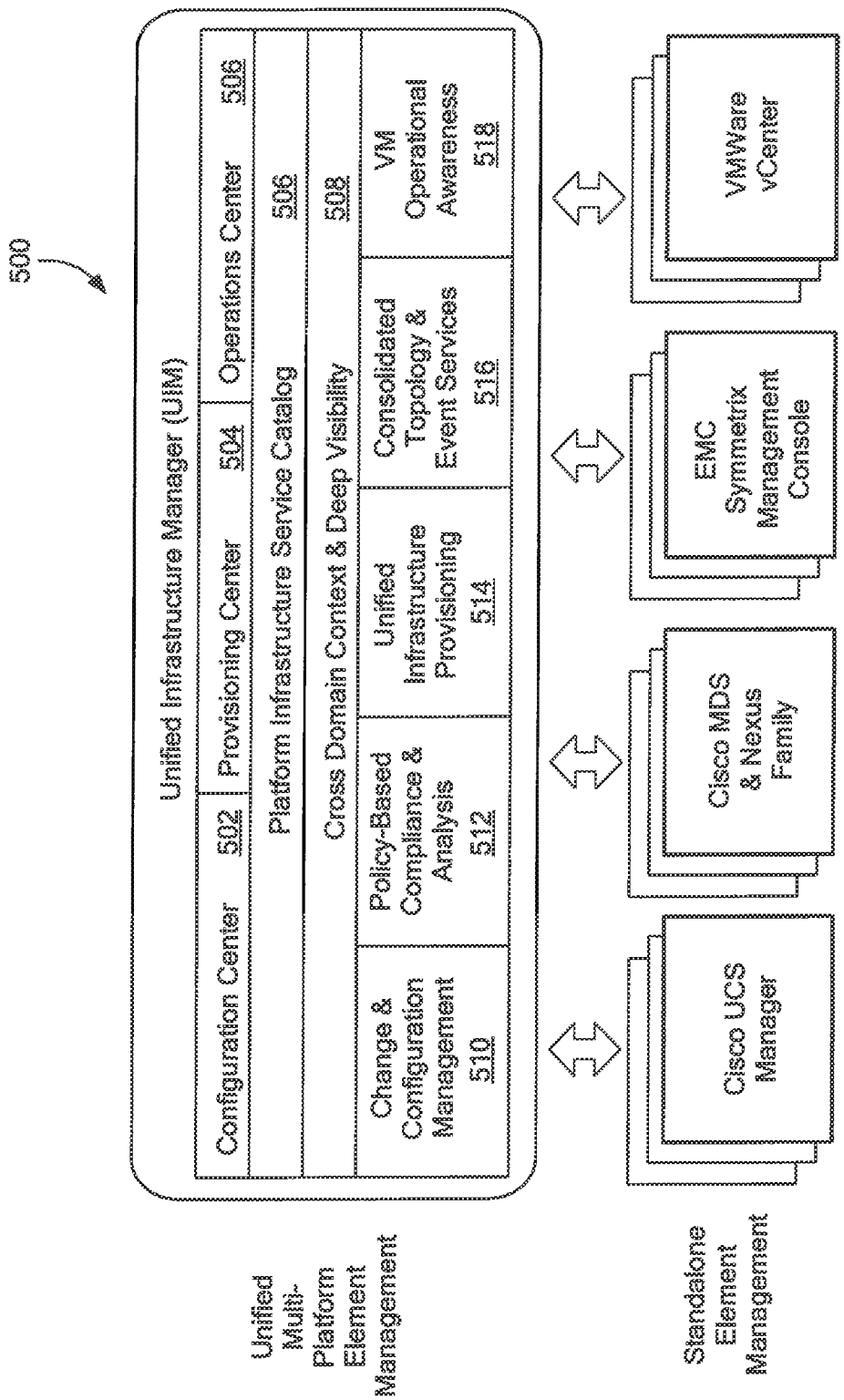
FIG. 5 is a schematic representation of a unified infrastructure manager (UIM) module.

FIG. 5 shows an exemplary unified infrastructure manager 500 having isolation zone functionality in accordance with exemplary embodiments of the invention. In an exemplary embodiment, the unified infrastructure manager 500 includes a configuration center module 502, a provisioning center module 504, and an operations center module 506. Below these modules is a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage layers, and other management applications. The unified infrastructure manager 500 performs platform deployment by abstracting the overall provisioning aspect of the platform(s) and offering granular access to platform components for trouble shooting and fault management.

Figure 6:
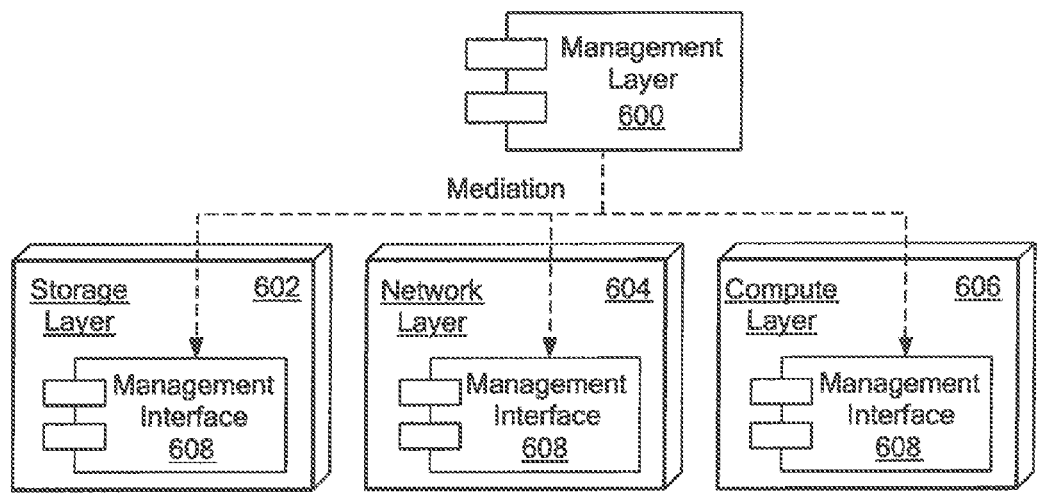
FIG. 6 is a schematic representation of layers having a management interface.

FIG. 6 shows a management/service layer 600 connected to a storage layer 602, a network layer 604, and a compute layer 606, each having a respective management interface layer 609. In general, the management layer 600 uses device native interfaces provided by the equipment vendor to translate desired configuration settings into actual configuration settings. The native interface is directly related to the equipment vendor. In one embodiment, the service management layer 600 uses native command line interfaces (CLI) provided by software components the equipment manufacturer supplies or using application programming interfaces (APIs) to send commands to the management interface using messaging protocols. The API defines a programming language binding for executing configuration instructions. In both cases the equipment manufacturer supplies computer software that drives the management interface. In the case of the CLI, the commands are either executed on the operating system hosting the management layer and communicating to the device over proprietary protocols or run on the operating system hosting the device management interface. CLIs typically take properties sets and return results in textual or encoded formats such as XML.

EXAMPLE naviseccli -h 192.168.101.40 bind r5 0 -rg 0 -cap 20 -rc 1 -sp a -sq gb -wc 1

APIs provide a native computer programming language binding that can be executed from the native computer programming language. Java is a widely used language in computer programming and many vendors provide java language libraries and examples to execute commands against the management interface of their devices.

Figure 7:
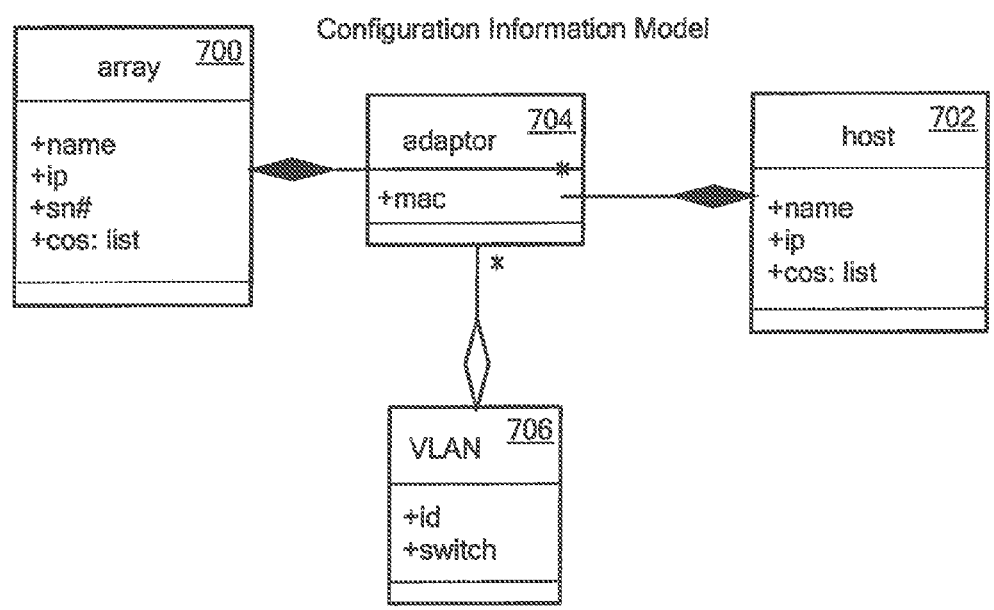
FIG. 7 is a representation of a configuration information model.

FIG. 7 shows a model of the physical information stored within the management layer of the components in FIG. 1. An array model component 700 contains properties that describe the pod and management information for the array. A host model component 702 contains properties that describe the pod and management information for the host. Instances of an adaptor model component 704 are associated with arrays and hosts to indicate the array or host has an Ethernet adaptor. Hosts and arrays may have many adaptors. Adaptors 704 may have additional detailed properties that indicate the identifier for the adaptor and network profiles indicating the IP addresses and MAC addresses of the adaptor. Instances of VLAN model components 706 are loosely associated with the adaptors representing the logical network connectivity between the adaptor and the other adaptors associated to that VLAN.

Figure 8:
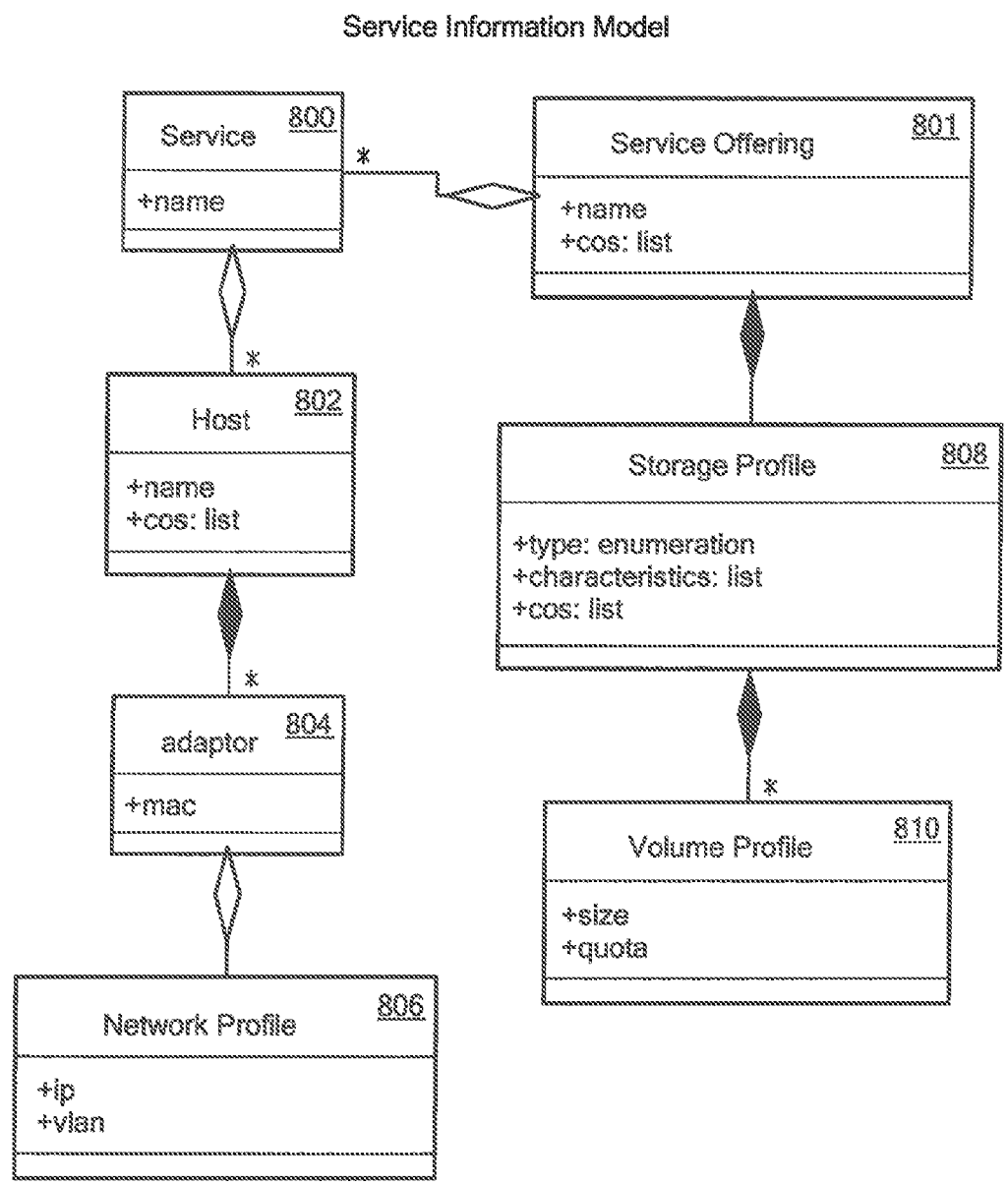
FIG. 8 is representation showing a service configuration model.
Figure 8A:
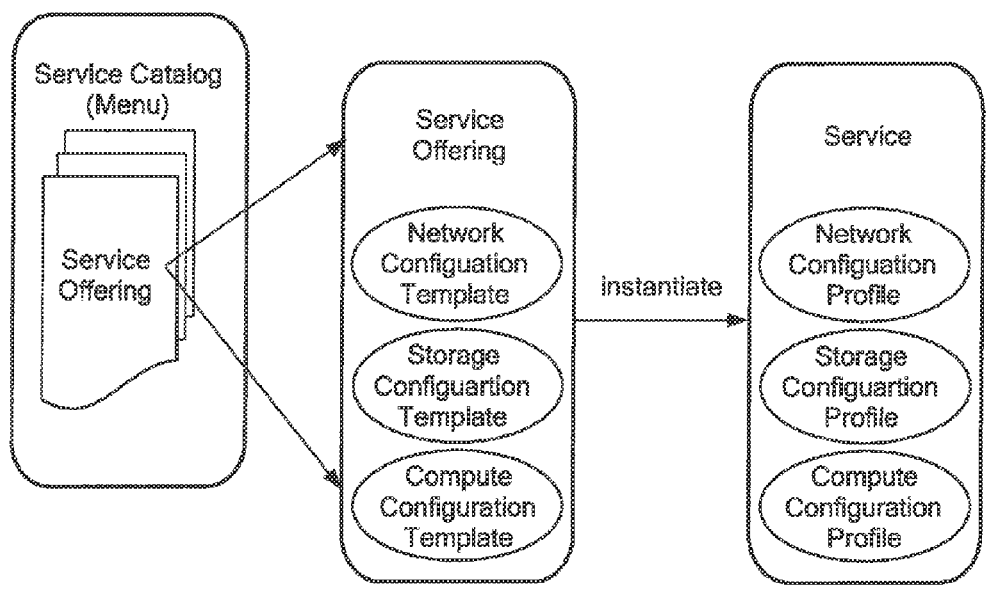
FIG. 8A is representation of a service catalog menu and service offerings.

FIG. 8 shows a model of the service and offering information stored within the management layer of the components in FIG. 7. A service 800 is a representation of a desired service as described by a service offering 801. An exemplary relationship is shown in FIG. 8A where the service properties as described in the offering are used to describe the characteristics and properties of the service to be created. A service catalog has a menu of service offerings, each having network configuration settings, service configuration settings, and compute configuration settings.

Referring again to FIG. 8, one or more hosts 802 are associated with a service to fulfill the compute requirements of the service. One or more network adaptors 804 are associated with a service to indicate the need for Ethernet connectivity to a network. A network profile 806 is associated with each adaptor 804 that indicates the VLAN and IP address required to fulfill the storage connectivity using the Ethernet. This network profile 806 is associated to a storage profile 808 to indicate that the host is to obtain storage from a network with this VLAN and IP network.

The service offering 801 is used to hold the relationships and detailed description for the user to choose the offering from a menu of offerings. The storage profile 808 is associated with the offering 801 to indicate the class of storage and service settings for the storage to be configured such as features like de-duplication, write once read many, auto-extension, maximum auto-extensions, thin provisioning, etc. A volume profile 810 is associated with the storage profile 808 to indicate specific volume properties and characteristics such as size and quota limitations.

Figure 9:
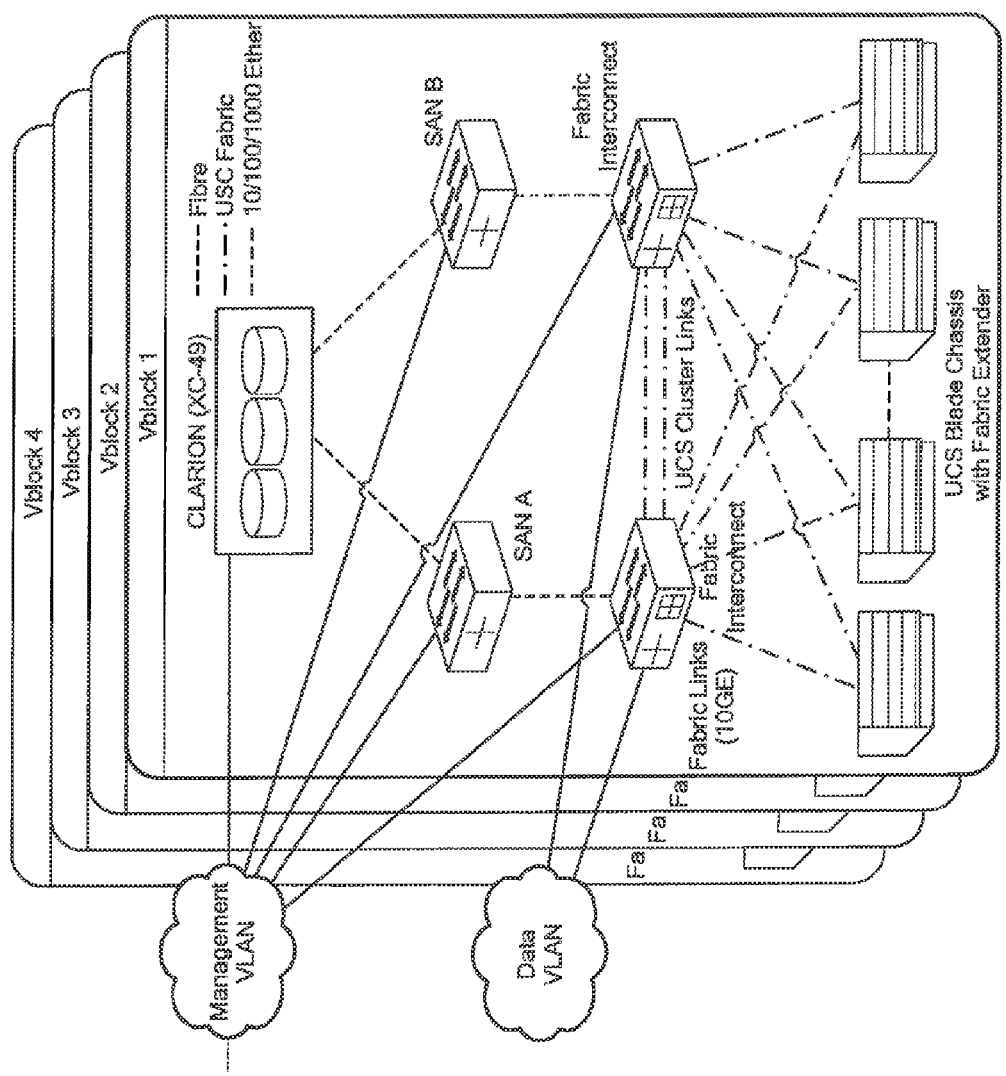
FIG. 9 is a schematic representation showing pods in a cloud environment.
Figure 10:
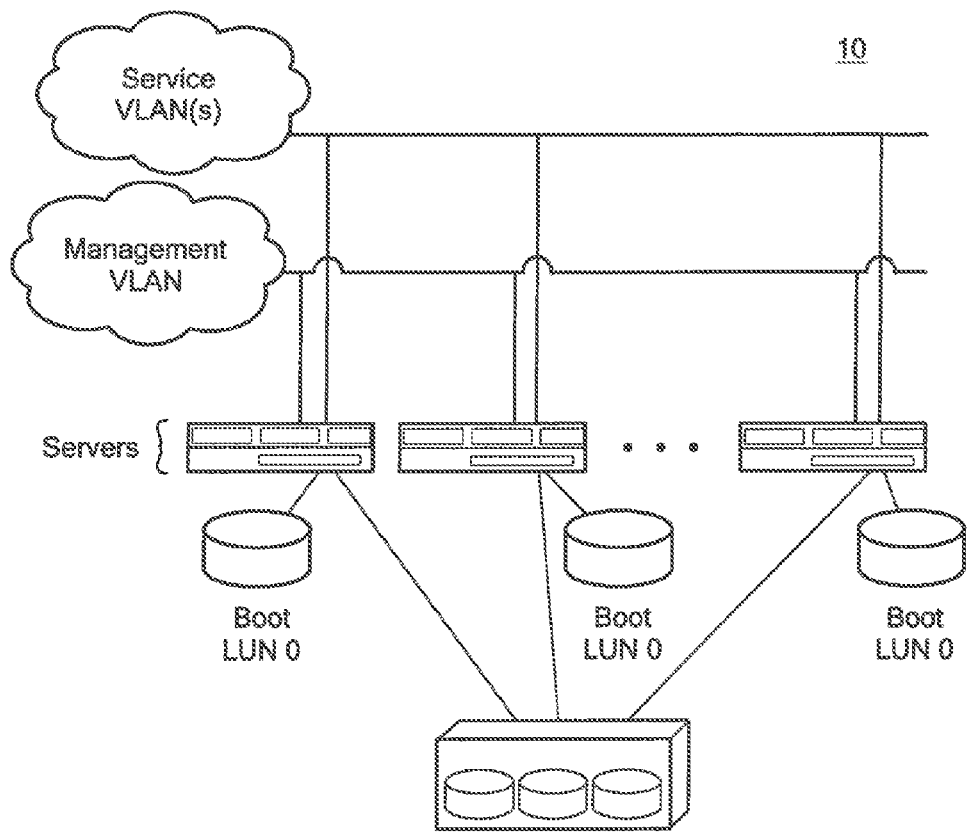
FIG. 10 is a schematic representation of servers coupled to shared storage.

FIG. 9 shows a series of "PODs" used to create cloud infrastructures, where each Vblock is considered its own POD. FIG. 10 shows a set of servers in a POD arranged in a cluster with shared storage.

Figure 11:
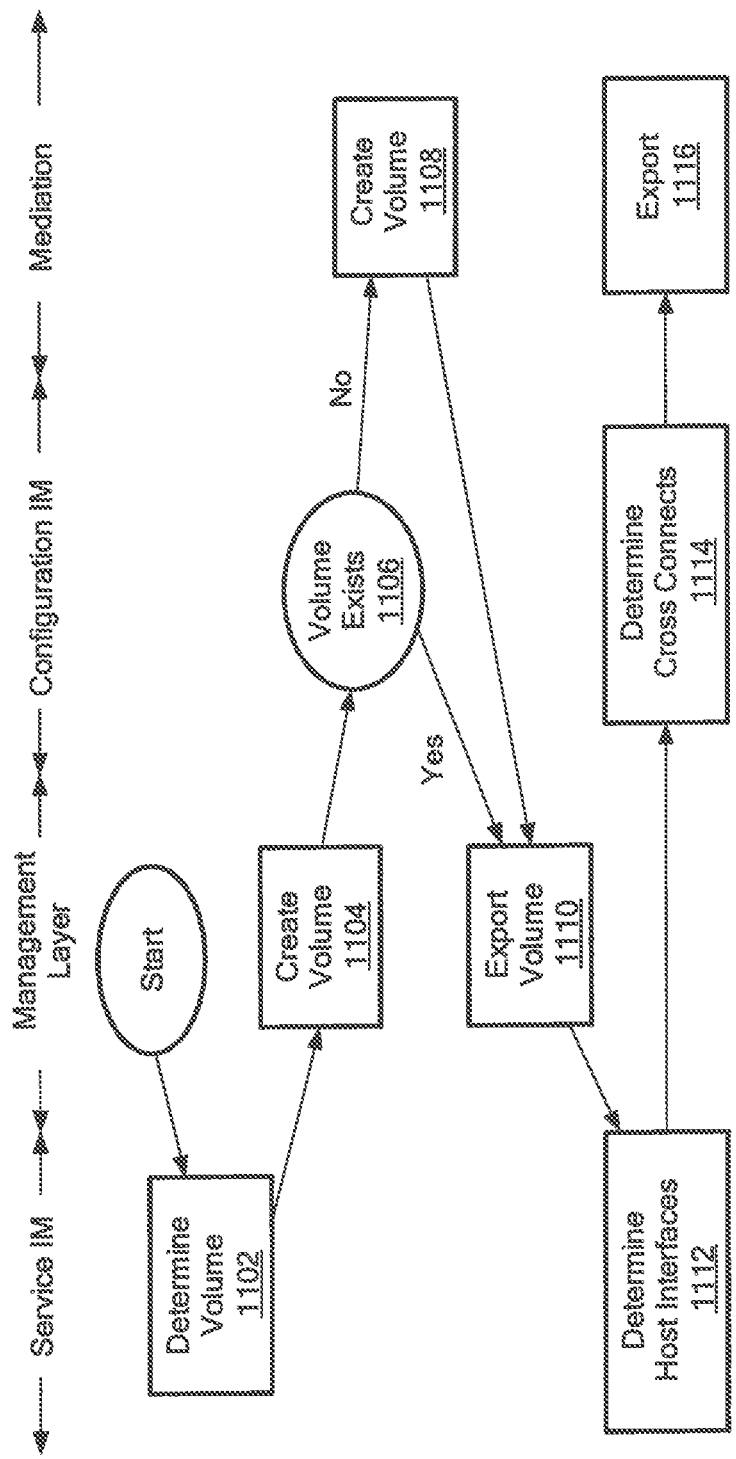
FIG. 11 is a flow diagram showing an exemplary sequence of steps for provisioning shared NFS storage.

FIG. 11 shows an exemplary sequence of steps for associating a NFS shared volume to a host. Initially, a user of the management layer selects an offering and chooses to have it implemented. The information presented to make this choice is described in the service information model and presented as a menu option for selection. The offerings can be defined statically and predetermined before accepting the menu selection. Optionally an administrator of the POD infrastructure can define a canned set of offerings to augment and extend the predefined offerings of the management layer.

In step 1102, based on the offering chosen by the user, a pod can be selected by the management layer using the service information model that defines the desired quality of service and class of service required. This information is described in the service information model storage profile and volume profile (see FIGS. 8 and 8A). Using this information the system can determine the correct pod placement for the volume.

Figure 11A:
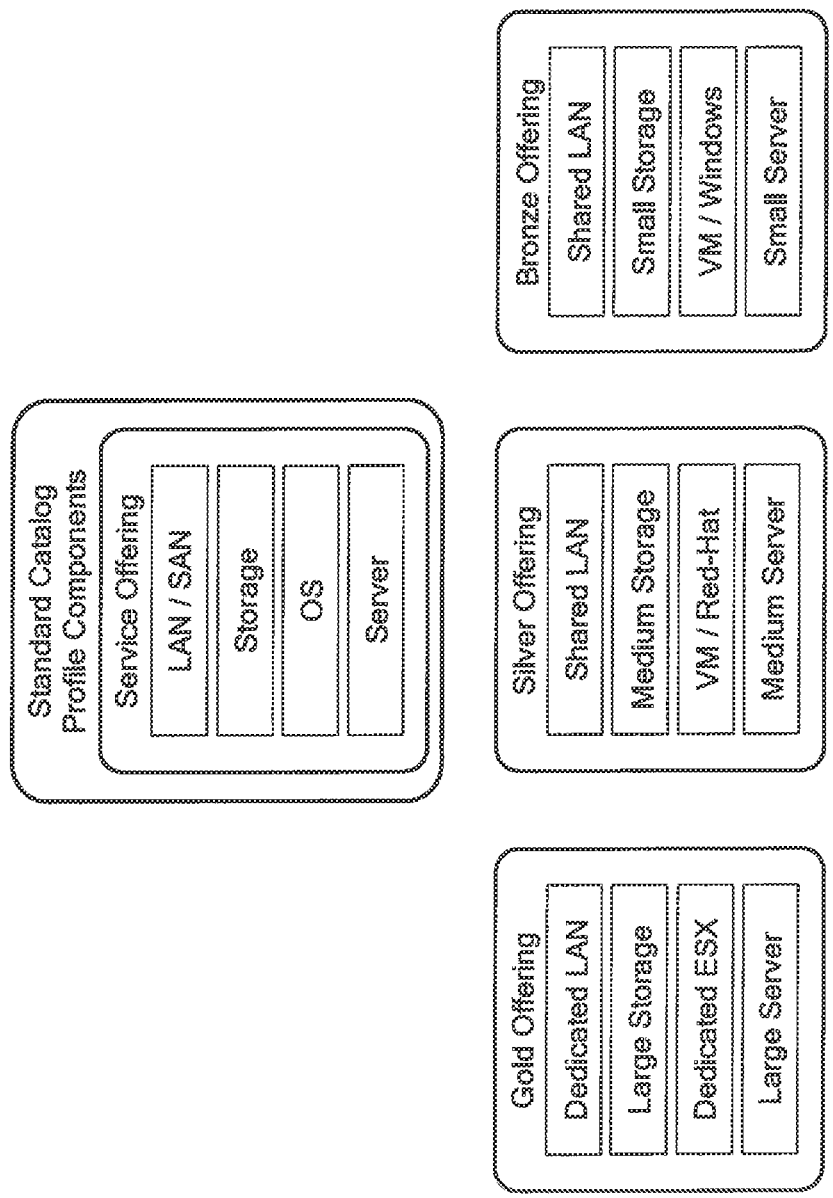
FIG. 11A is a pictorial representation of various service offerings.

A POD is chosen by matching the class of service defined in the offering with the class of service provided by the POD. The Class of Service (CoS) is defined as a label that is relative to the service provided by the POD. For example, as shown in FIG. 11A, a Gold class of service could be defined as having a dedicated LAN, large storage, dedicated ESX and a large server. Silver and Bronze offerings provide less in at least one area. In embodiment, the Gold class of service provides do-duplication. When selecting a POD for service placement the management layer selects an array that provides the de-duplication feature for Gold services. The list of CoS for an array would be cross referenced with the list of CoS for a service offering to locate an acceptable pod and array on which to create the service.

In step 1104, once the volume characteristics and properties are known from the service information model, the service layer can begin to create the volume by defining the configuration settings such as size, protection levels, and placement of the volume on a data mover in relationship to the VLANs connecting the host and array adaptors from the configuration model. The properties of the volume are used in conjunction with the CoS of the Storage Profile to create the configuration settings of the volumes in the service. The Service's network profile determines the VLAN upon which to establish the network connection to the network shared volume. In step 1106, it is determined whether the volume exists, such as by using the management interface of the array the service layer to query the array(s) of the pod to see if there were already volumes created for that service If it is determined the service does not already contain a volume that meets the criteria of the offering, the management layer executes commands through a mediation interface to the physical device management system to create the volume using the characteristics determined above in step 1108.

Processing continues in step 1110 wherein the volume is exported. Using the network profile information contained in the service information model, the service layer determines the network access restrictions consisting of the VLAN, IP address, and authentication credentials for the network-attached volume.

In step 1112, a host interface is determined using the service information model network profile and the VLAN and IP address settings are determined for the host adaptor. In step 1114, the management layer determines cross-connects. Using the VLAN the correct adaptor for the array can be determined by cross-referencing the membership of the adaptor in a given VLAN. In step 1116, using the information determined above, the array management interface is configured to expose the created volume using NFS protocol to the determined IP address.

Figure 12:
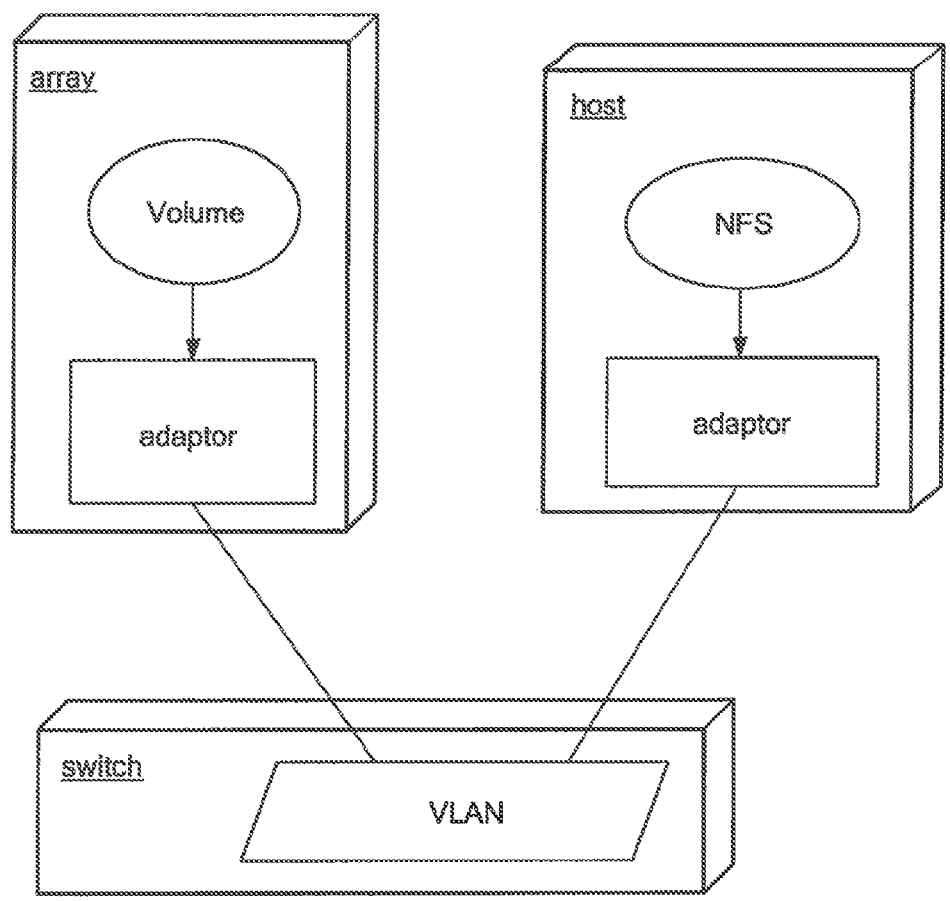
FIG. 12 is a schematic representation of a VLAN coupled to an array and host in a cloud environment.

FIG. 12 is a logical schematic for the service to be created as the result of the flow of FIG. 11. An array is told via mediation to create a volume and export it to a given IP address. A volume is created using the service offering storage and volume profiles. A array adaptor exports the volume to the IP address and implements the access control defined in the service network profile. A switch/vlan is utilized to carry NFS over IP traffic from the adaptor of the array to the adaptor of the host. The host uses its operating system network file system sub-system to make the array volume visible to the guest of the host. The nfs uses the adaptor interface to access the IP network and access the volume exposed over the switch's VLAN.

Figure 13:
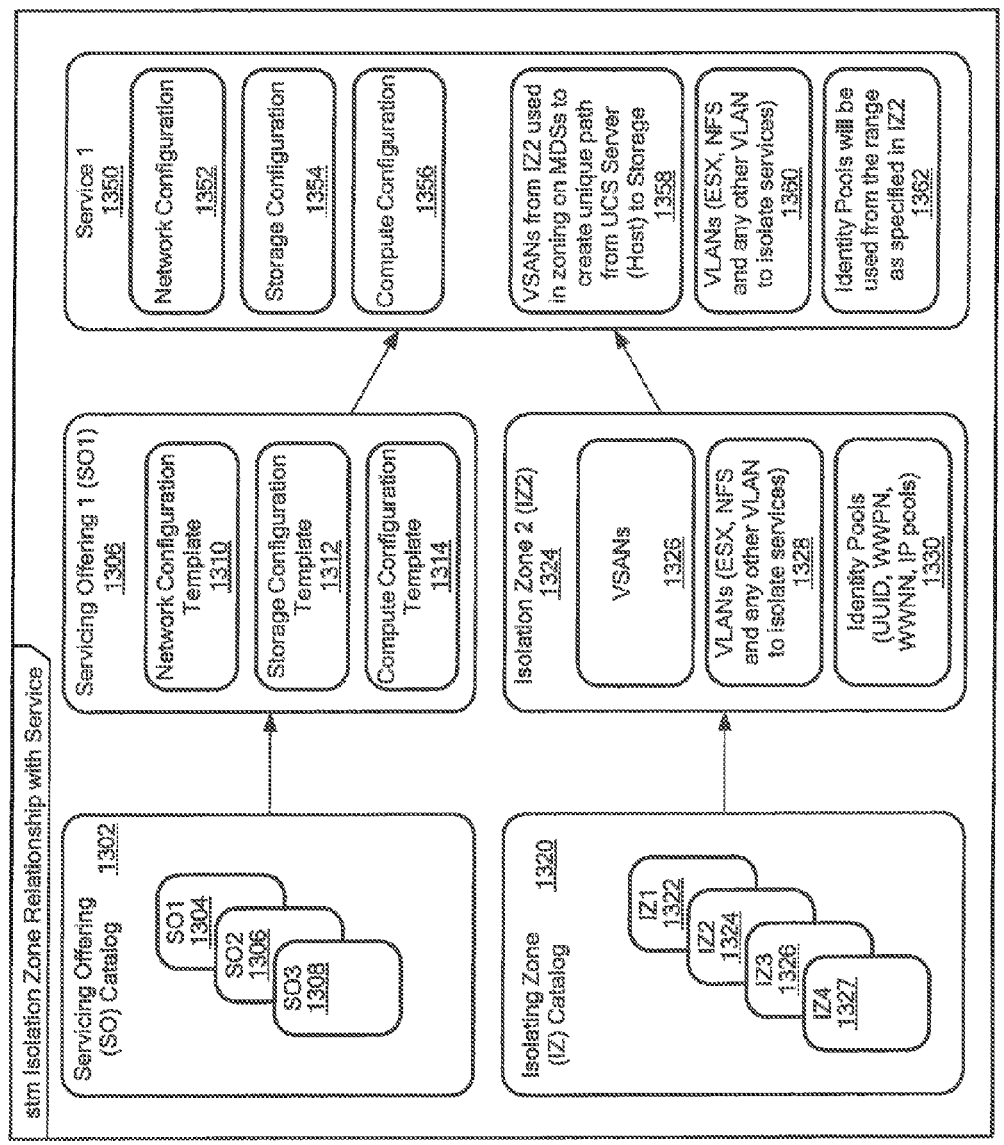
FIG. 13 is a schematic representation of isolation zone relationships to a service in accordance with exemplary embodiments of the invention.

FIG. 13 shows associations 1300 between service offering, isolation zone and service. A service offering catalog 1302 includes a series of service offerings 1304, 1306, 1308. A service offering, shown as 1306, includes a network configuration template 1310, a storage configuration template 1312, and a compute configuration template 1314.

It is understood that an isolation zone can be considered a wrapper which can include values that can isolate services in the cloud as desired by user. Isolation zones can include VLANs, VSANs, UUID range, WWPN range, WWNN range, MAC addresses range, Identity pools range in case of file systems.

UUID—Universally unique identifier
WWPN—World Wide Port Name
WWNN—World Wide Node Name
MAC address—Media Access Control address An isolation zone catalog 1320 includes a series of isolation zones 1322, 1324, 1326 1327. An exemplary isolation zone 1324 includes associated VSANs 1326, VLANs 1328, and identity pools 1330. Exemplary VLANs 1328 can include ESX, NFS and other components to isolate services. Illustrative identity pools 1332 include UUIDs, WWPNs, WWNNs, and IP pools.

A first service 1350 includes a network configuration 1352, a storage configuration 1354, and a compute configuration 1356 based on the templates in the service offering 1306. The first service 1350 further includes VSANs 1358, VLANs 1360, and identity pools 1362 from the isolation zone 1324. In an exemplary embodiment, the VSANs from the isolation zone 1324 are used in zoning MDS components to create unique path(s) from the USC server to storage.

Figure 13A:
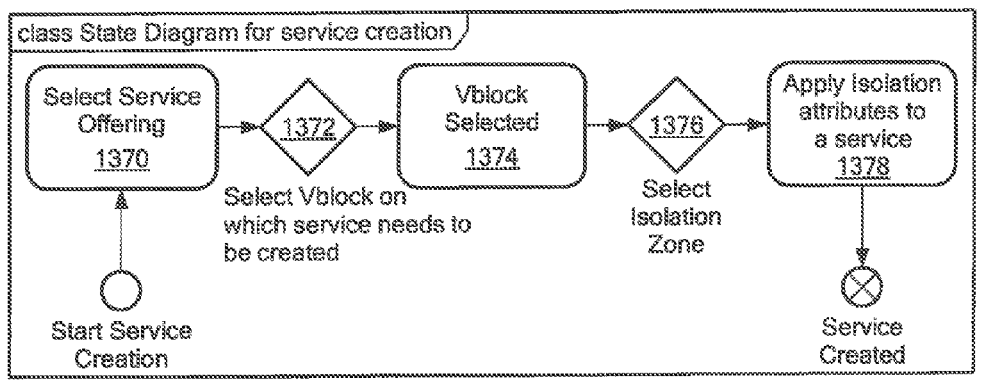
FIG. 13A is a state diagram showing service creation.

As shown in FIG. 13A, at the start of creating a service, the system receives a selection of service offering from a user 1370. A Vblock on which service is to be created is selected 1372. With the Vblock selected 1374, an isolation zone is selected 1376. The attributes of the selected isolation zone are then applied to the service 1378, as described more fully below.

Figure 14:
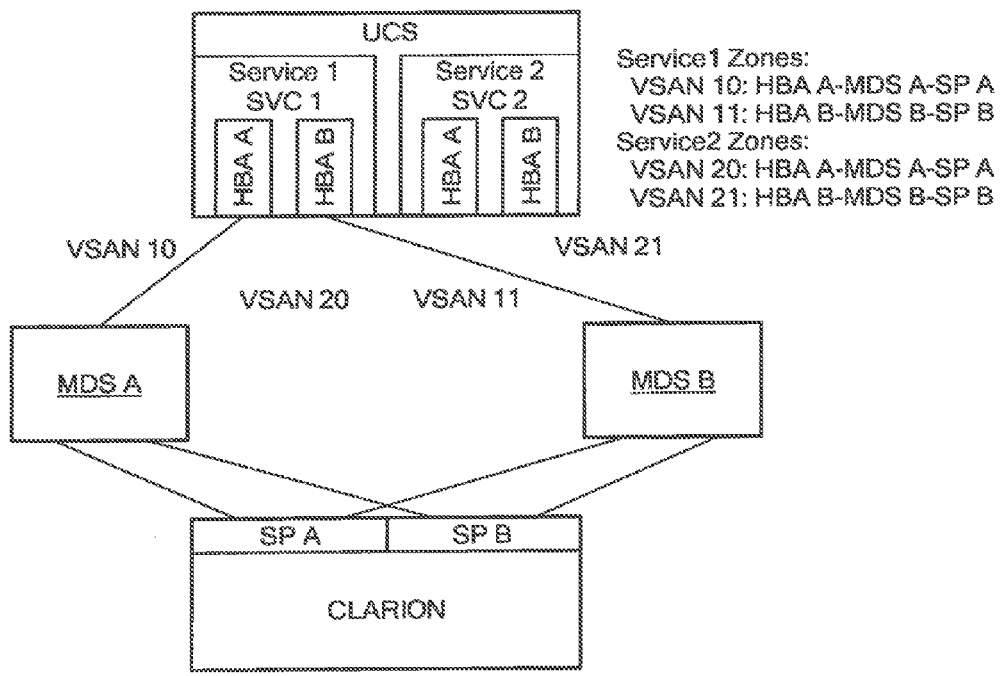
FIG. 14 is a schematic representation of a system having isolation zones.

FIG. 14 shows an example of VSAN isolation. A first service SVC 1 and a second service SVC2 are isolated through first and second VSANs 10, 20, respectively, on a first network switch MDSA and through third and fourth VSANs 11, 21, respectively, on a second network switch MDSB.

An isolation zone provides a user the ability to have some separation between services in the same Vblock (composed of UCS, Storage Array and two MDS, for example) at the network level, SAN level, and pool level. This enables the system to isolate services belonging to one customer from services that belong to other customers. For example, suppose a large service provider has two customers, Burger Chain 1 and Burger Chain 2. The UIM administrator can create first and second isolation zones called 'BC1' and 'BC2'. In each isolation zone, a pair of VSANs, NFS IP pool, NFS VLAN, and ESX management VLAN is identified. The isolation zone is then applied to the service and various components are applied as a package.

In an exemplary embodiment, an isolation zone can be created based on values provided by the user. Exemplary values include ESX Management VLAN, NFS VLAN, Operating System Install VLAN, VSANs for Fabric A and B, and identity pools (UUID, MAC, WWPN, WWNN, IP Pools). The system can return the applicable Vblocks for an Isolation Zone, meaning that it returns a list of Vblocks on which the isolation zone can be used. In one embodiment, the system can verify if the same VLANs and VSANs values can be used across different Vblocks. The system can also get a list of isolation zones that are valid for a specific Vblock. This can be used to verify if the VLANs and VSANs used in an Isolation Zone exist on a Vblock.

Figure 15:
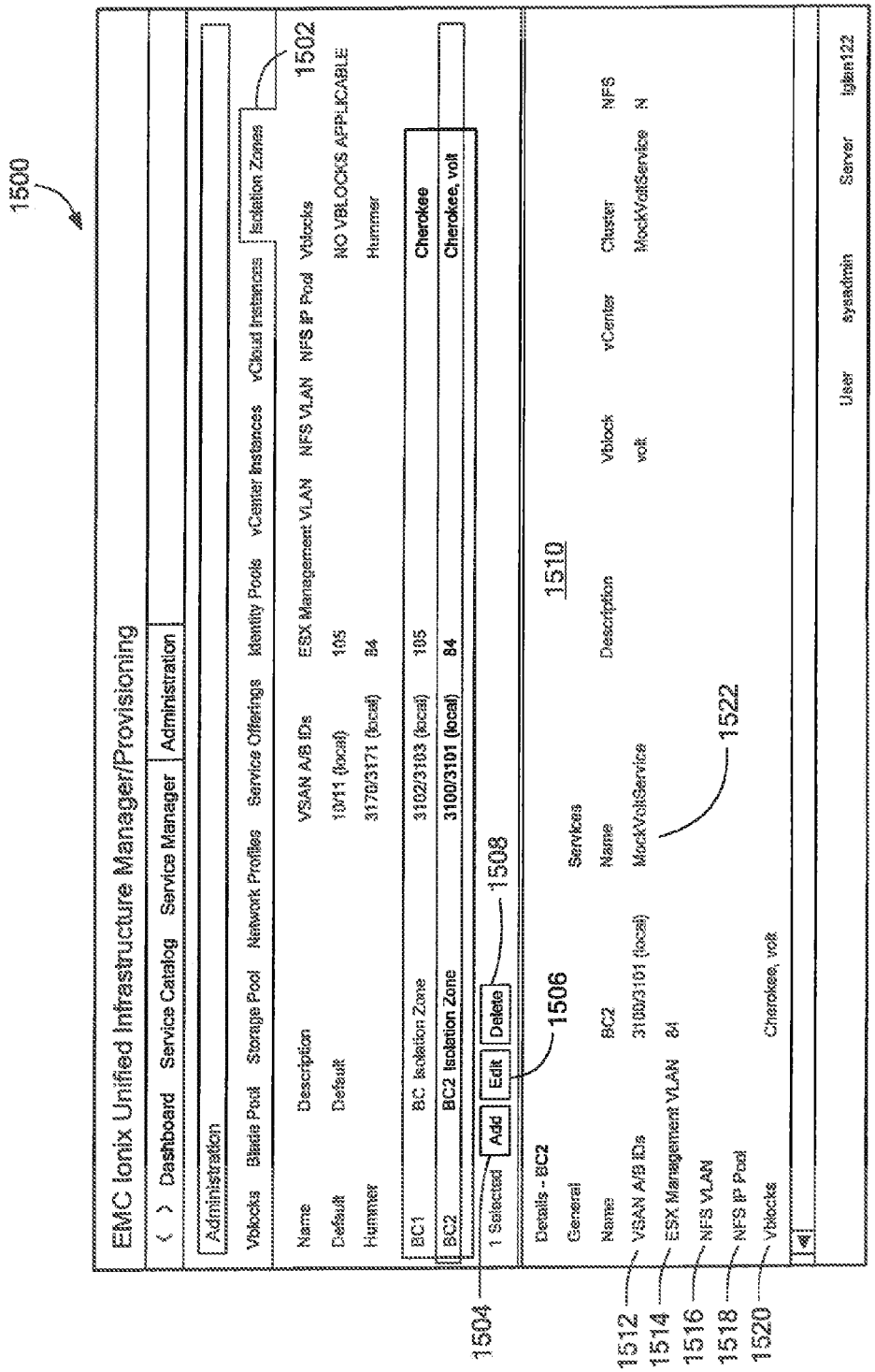
FIG. 15 is a screen display showing isolation zone information.

FIG. 15 shows an exemplary display screen 1500 with an Isolation Zone Tab 1502 that enables a user to Add 1504, Edit 1506 or Delete 1508 an isolation zone. Once a specific isolation zone is selected, shown as BC2, the services section 1510 shows the services that are using the selected Isolation Zone, here shown as BC2. The isolation zone BC2 includes VSANs 1512, ESX VLAN 1514, NFS VLAN 1516, NFS IP Pool 1518, and Vblock 1520. A service 1522 for the isolation zone is also listed.

Figure 15A:
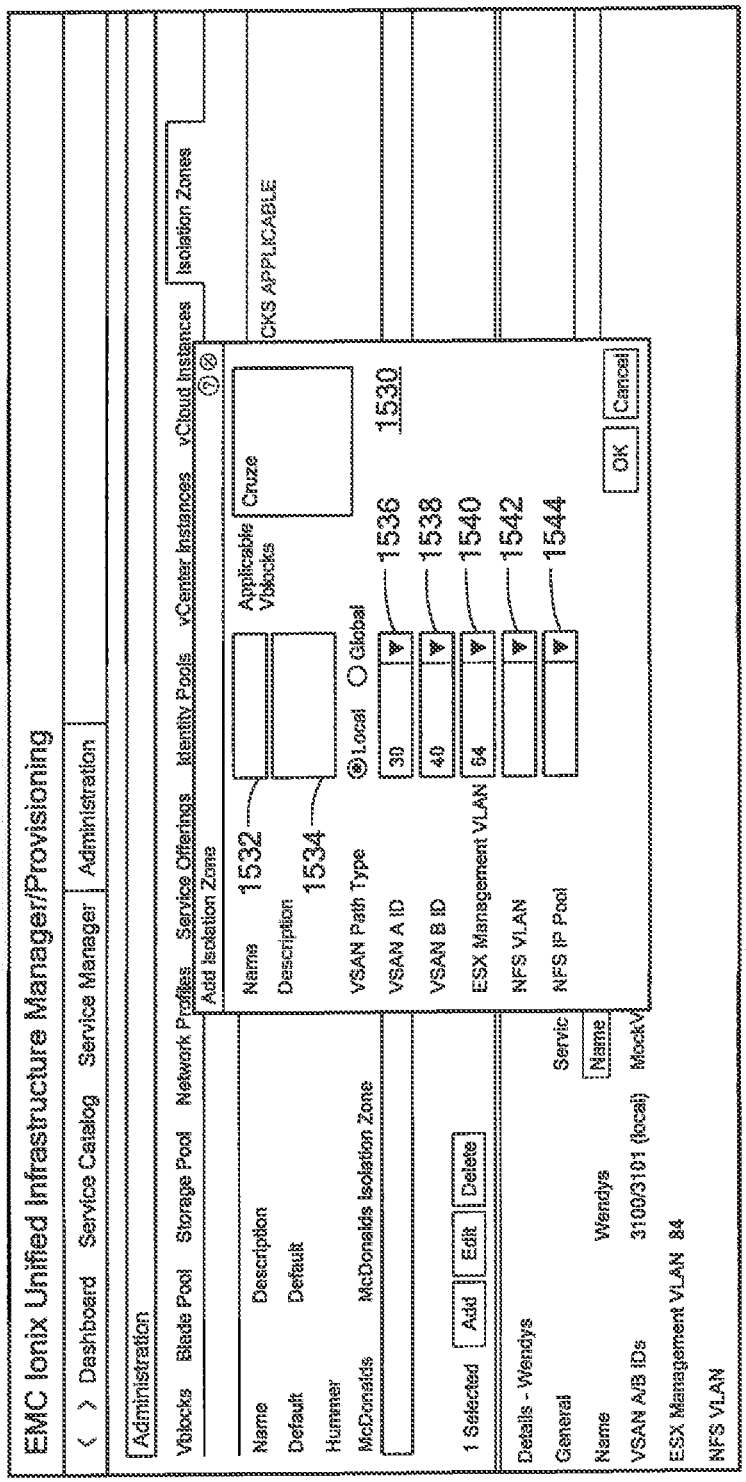
FIG. 15A is a screen display showing addition of an isolation zone.

FIG. 15A shows an exemplary display screen 1530 for an add dialog for an isolation zone. A user can enter information in a name field 1532 and in a description field 1534. In an exemplary embodiment, an isolation zone comprises VSAN A ID 1536 used in zoning on MDS A and UCS. As described above, a virtual storage area network (VSAN) is a logical partition in a storage area network (SAN). VSANs allow traffic to be isolated within specific portions of a storage area network.

A VSAN B ID 1538 is used in zoning on MDS B and UCS. ESX Management VLAN 1540. A virtual local area network (VLAN) results from partitioning a physical network, so that distinct broadcast domains are created. A NFS VLAN 1542 can also be input by a user. A NFS IP Pool 1544 is used to assign an IP address to a NAS storage client. UUID, WWNN, WWPN can also be used.

Figure 15B:
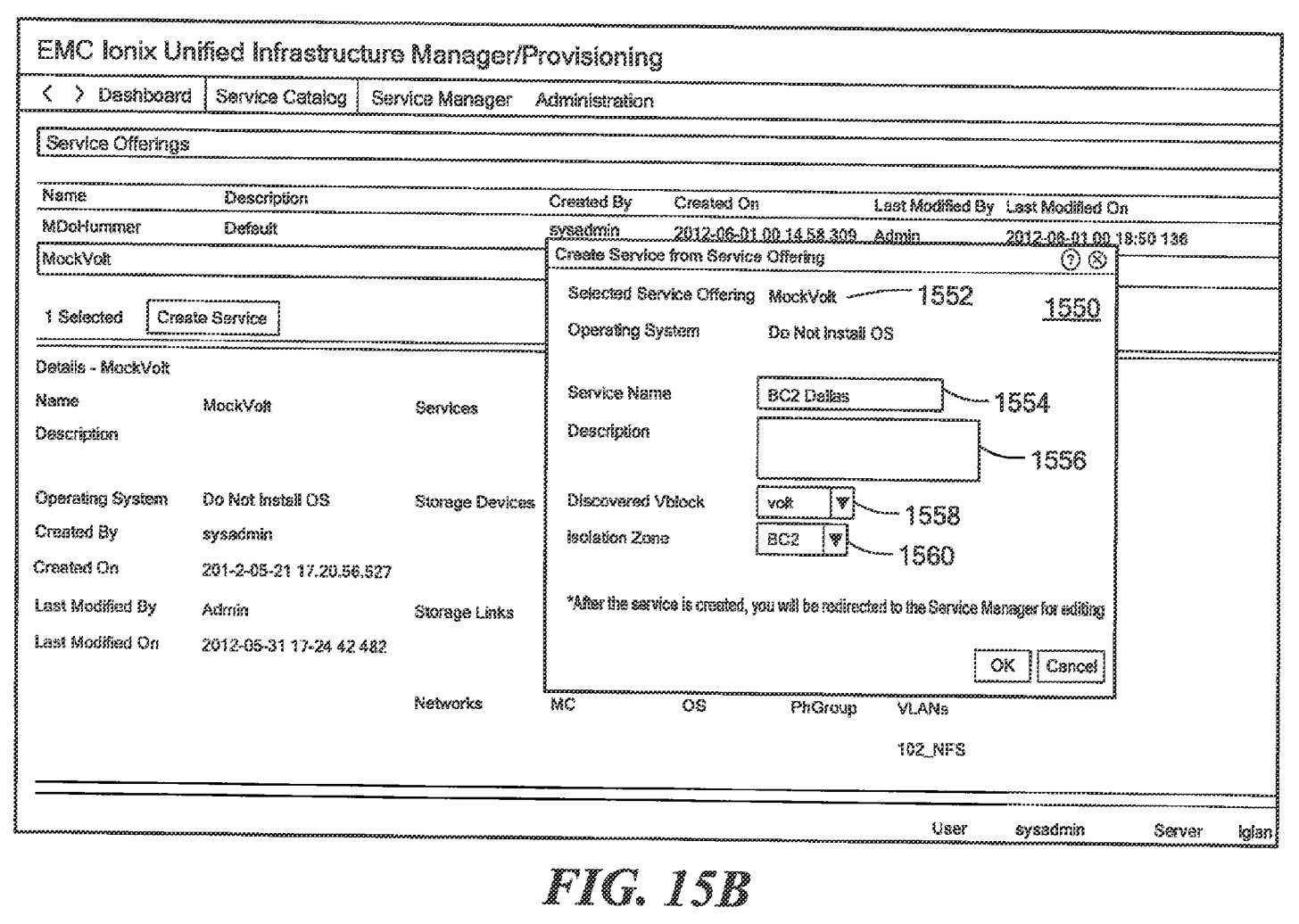

FIG. 15B shows an exemplary display screen 1550 showing how an isolation zone is selected for a service. In the illustrative screen, the service offering 1552 is shown as MockVolt for service 1554 BC2 Dallas. A description 1556 for the service can be entered by the user.

The discovered Vblock 1558 for the service is shown as volt and the isolation zone 1560 is shown as BC2 (burger chain 2 from above).

Figure 16:
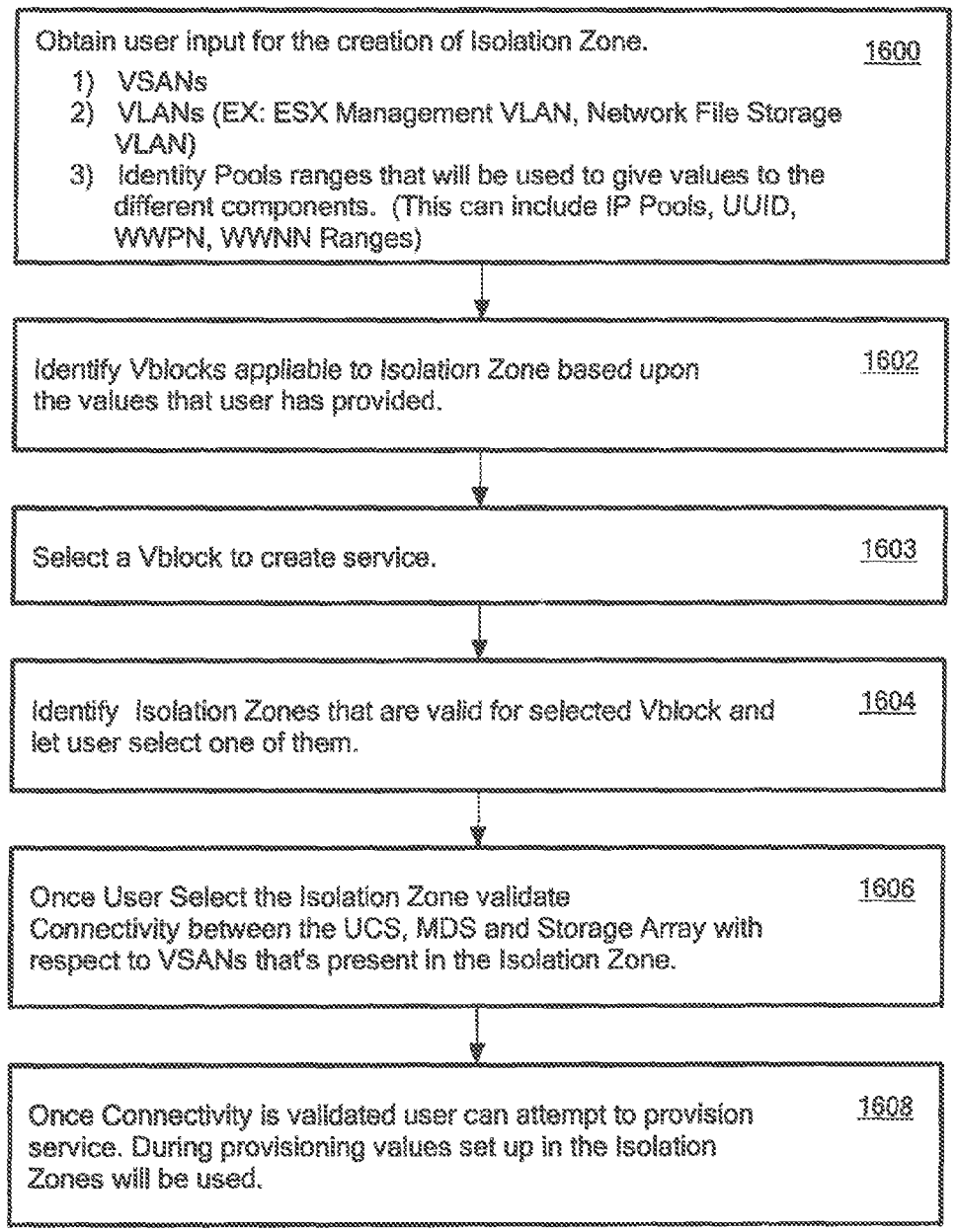
FIG. 16 is a flow diagram showing an exemplary set of steps for isolation zone implementation.

FIG. 16 is a flow diagram showing an exemplary sequence of steps for creating an isolation zone. In step 1600, a user provides input for components in the isolation zone. Exemplary components include VSANs, VLANs (e.g., ESX Management VLAN, Network File storage VLAN, and identity pool (IP) ranges that will be used to give values to the different components. This can include IP Pools, UUID, WWPN, WWNN ranges. In step 1602, the system can identify vblocks that are applicable to an isolation zone based upon the values provided by the user. This enables a determination of whether the same VLANs and VSANs values can be used across different Vblocks, for example.

In step 1603, a user selection for vblock to create a service is received. In step 1604, the system identifies isolation zones that are valid for a given Vblock and enables a user to select one of the isolation zones. This can be used to verify if the VLANs and VSANs in an isolation zone exist on a given Vblock. In step 1606, after the user has selected an isolation zone, connectivity between cloud components can be validated. For example, the connectivity between UCS and MDS with respect to VSAN, as well as connectivity between MDS and storage array can be validated. If users try to use an isolation zone to create a service and there is not connectivity with respect to VSANs in the isolation zone between various components of the Vblock, then an error message can be generated. In step 1608, after connectivity validation, the user can attempt to provision the service based upon the values provided by the user.

In one embodiment, in the isolation zone a user can create a different isolation zone with a different pair of VSANs, but can use the same VLANs and get the identity values from the same pool, so as to isolate only SAN traffic in different services. In addition, it is possible to only isolate Ethernet networks between services get the identity values from the same pool and use same VSANs for zoning. Further, it is possible to isolate both SAN and Ethernet networks and obtain the identity values from the same pool. It is also possible to isolate SAN, Ethernet Network and also Identity Pools (UUID, MAC, WWPN, WWNN, IP pools)

Figure 17:
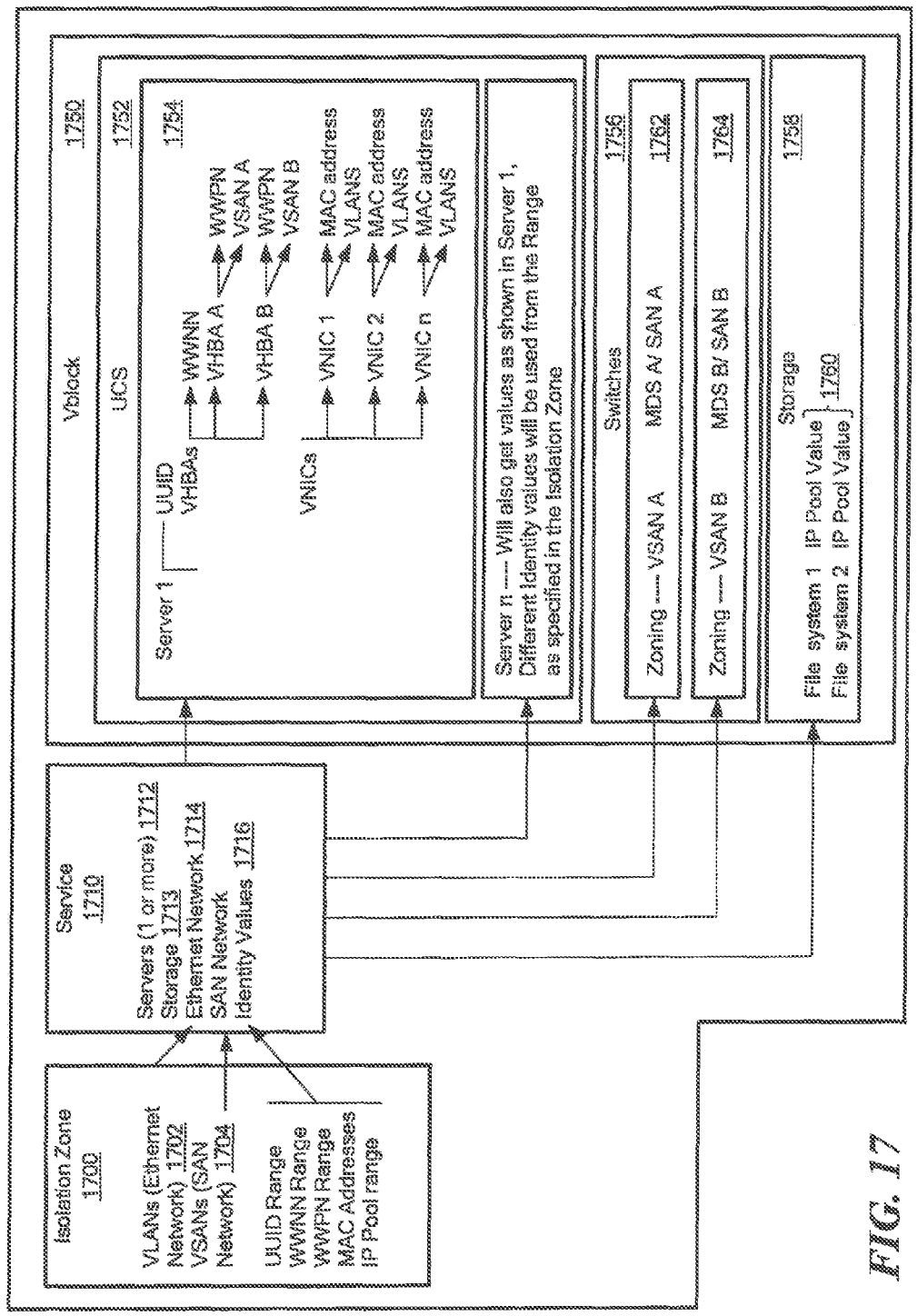
FIG. 17 is a schematic representation of relationships between an isolation zone, service, and vblock.

FIG. 17 shows how the values specified in the isolation zones with respect to an Ethernet network, SAN and identity values are used for a service. An isolation zone 1700 can include a VLAN 1702, VSANs, 1704 etc. A service 1710 includes an associated server 1712, storage 1713, Ethernet network 1714, and identify pool 1716 values. The service has different components, which are created on different devices UCS, Switches, Storage Array. UCS, Switches, Storage Array together form a Vblock.

As described above, a vblock 1750 can include a UCS 1752, switches 1756, and storage 1758. The storage 1758 can include IP Pool Values 1760, shown as File System 1, and File System 2. The switches 1756 can include a first switch 1762 provide VSAN A and a second switch 1764 providing VSAN B.

The UCS 1752 includes a first server 1754 having a UUID and an associated VHBA A, which has a WWPN and an association with VSAN A. The first server has an associated VHBA B, which has a WWPN and an associate with VSAN B. The first server 1754 can further include VNICs each having a MAC address and a VLAN.

As can be seen, the service 1710 components are created using the vblock devices, e.g., the UCS 1752, switches 1756, and storage 1758.

Figure 18:
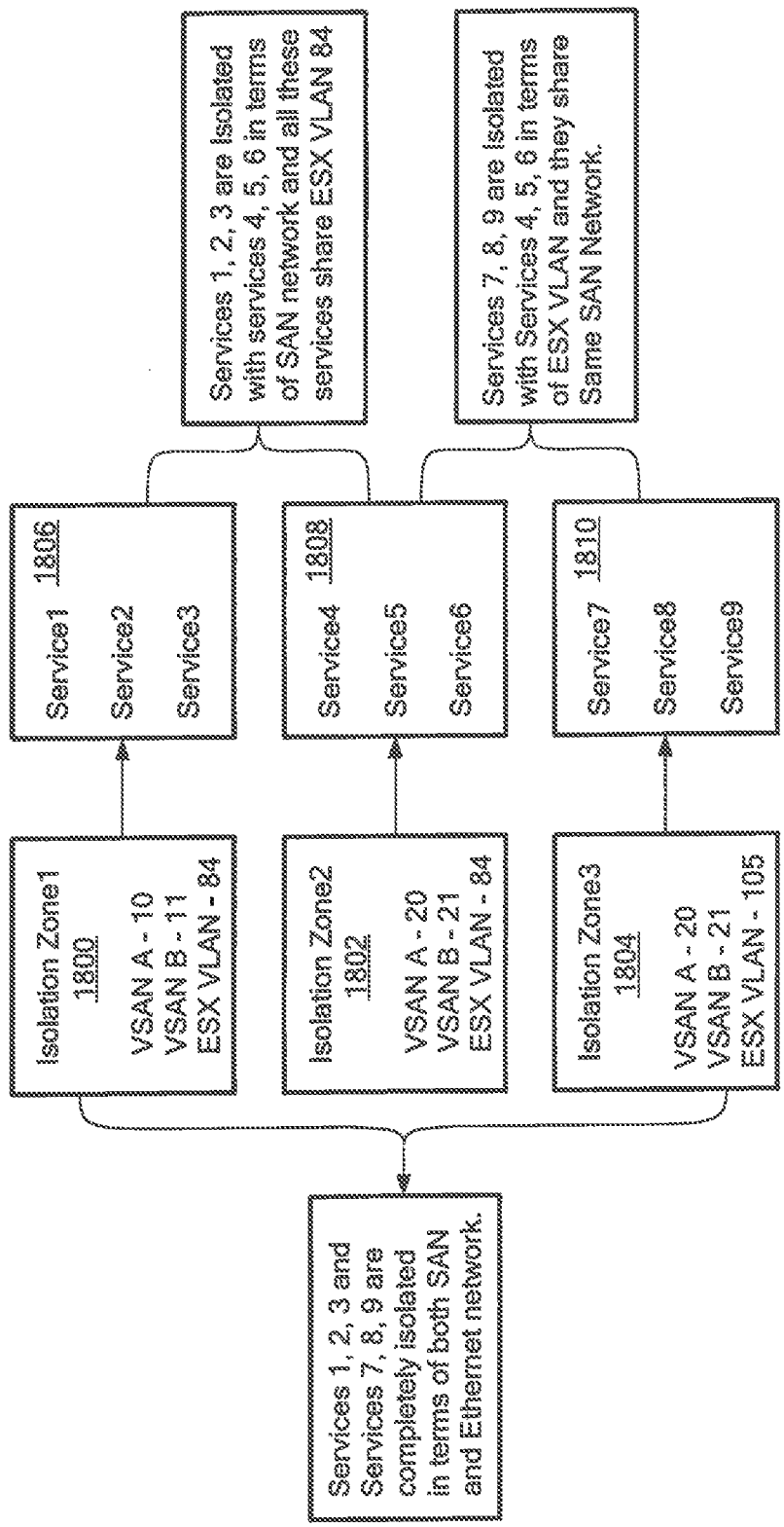
FIG. 18 is a schematic representation of relationships between services and isolation zones.

FIG. 18 shows how services can be isolated with respect to SAN and Ethernet/LAN networks by using an isolation zone. A first isolation zone 1800 includes VSAN A 10, VSAN B 11, and ESX VLAN 84. It is understood that 10, 11, and 84 refer to arbitrary numerical designations for the components in the system. A second isolation zone 1802 includes VSAN A 20, VSAN B 21, and ESX VLAN 84. A third isolation zone 1804 includes VSAN A 20, VSAN B 21 and ESX VLAN 105.

First, second and third services 1806 use the first isolation zone 1800, fourth, fifth, and sixth services 1808 use the second isolation zone 1802, and seventh, eighth, and ninth services 1810 use the third isolation zone 1804. As can be seen, the first and second isolation zones 1800, 1802 use different VSANs but use the same ESX VLAN 84. The second and third isolation zones 1802, 1804 use same VSANs A 20, VSAN B 21, and different ESX VLANs. The first and third isolation zones 1800, 1804 do not have any common VSANs or ESX VLAN. Thus, services 1, 2, 3 1806 are completely isolated from services 7, 8, 9 1810 in terms of the SAN and Ethernet networks.

Figure 19:
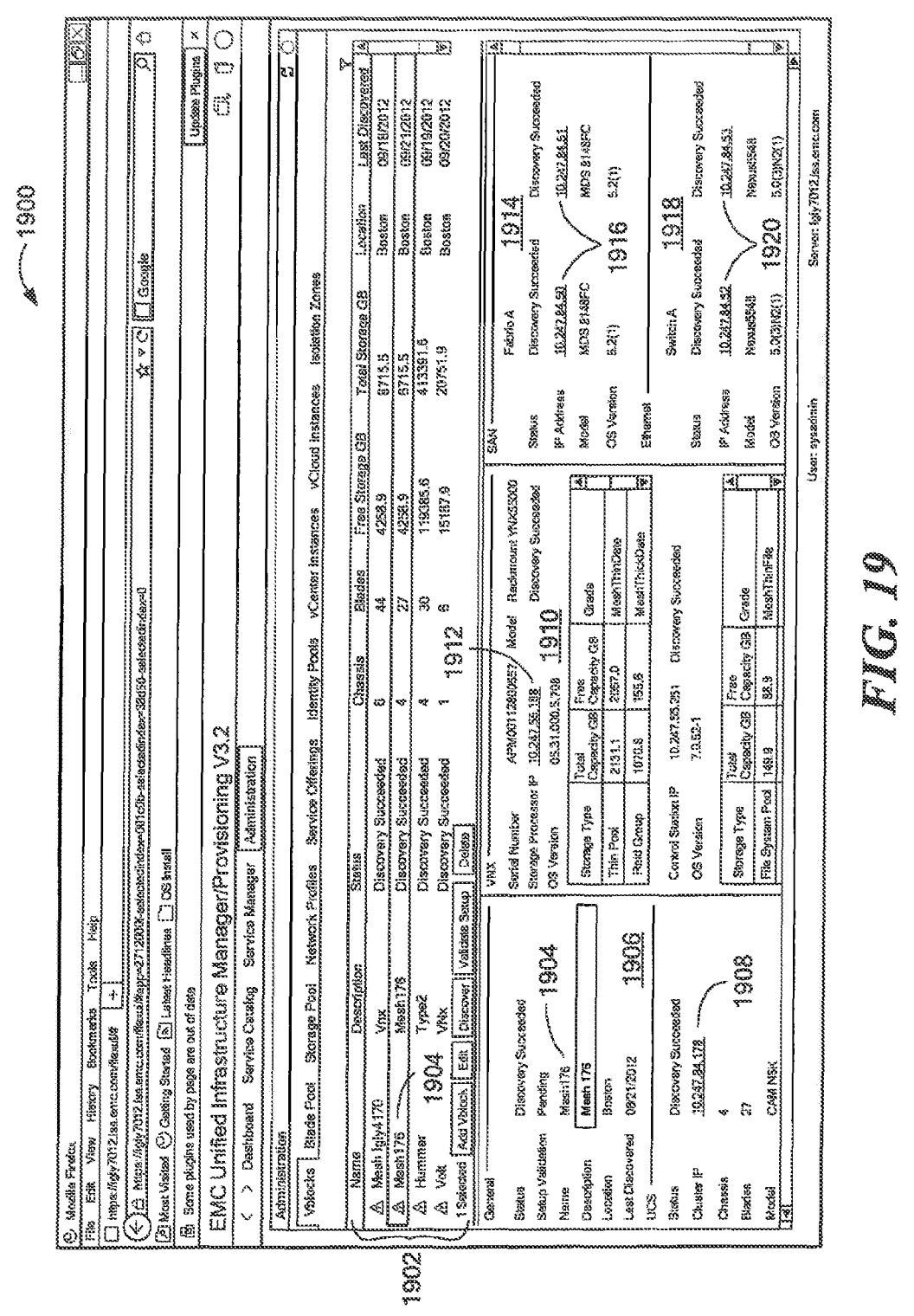

FIG. 19 shows an exemplary screen display 1900 having four vblocks 1902 with different components of selected vblock named mesh176 1904. The illustrative vblock mesh176 1904 has a UCS 1906 with a given IP address 1908, storage 1910 with a given IP address 1912, SAN 1914 with Fabric A and B having respective IP addresses 1916, and Ethernet 1918 with switch A and B having respective IP addresses 1920.

FIG. 20 shows an exemplary isolation zone 2000 (Burger Chain 3) that is applicable to multiple vblocks 2002 (Mesh176 and Volt). The isolation zone 2000 has a VSAN A ID shown as 3100 and a VSAN B ID shown as 3101, and an ESX Management VLAN shown as 84.

Figure 21:
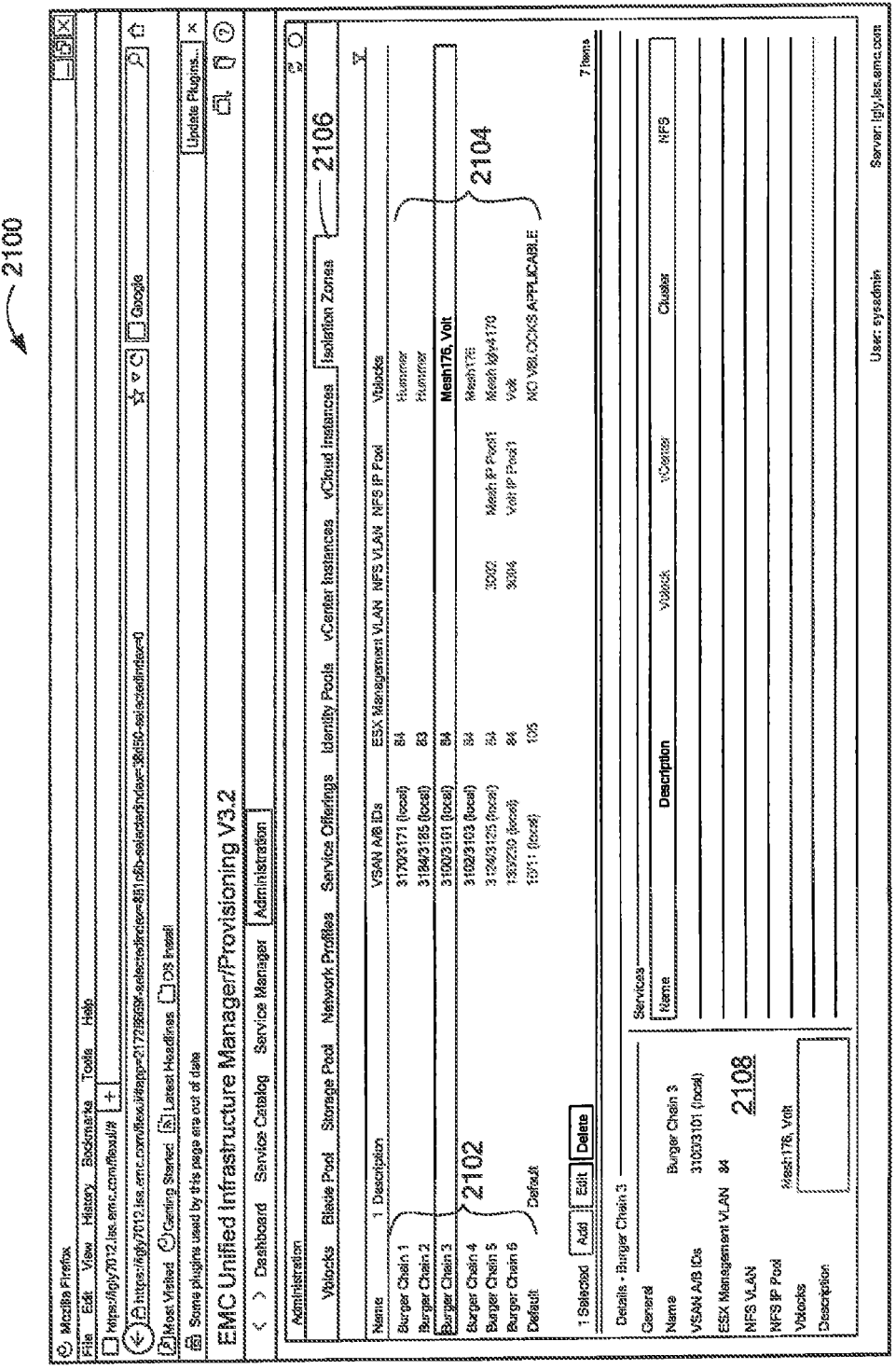
FIG. 21 is an exemplary screen display showing isolation zones and detail for a selected isolation zone.

FIG. 21 shows an exemplary display 2100 having different combinations of isolation zones 2102 and vblocks 2104 applicable for a selected isolation zone, shown as Burger Chain 3. As can be seen the isolation zone tab 2106 is active. The selected isolation zone Burger Chain 3 is shown in a detail area 2108 to have VSAN A,B IDs of 3100, 3101 and ESX management VLAN 84.

Figure 22:
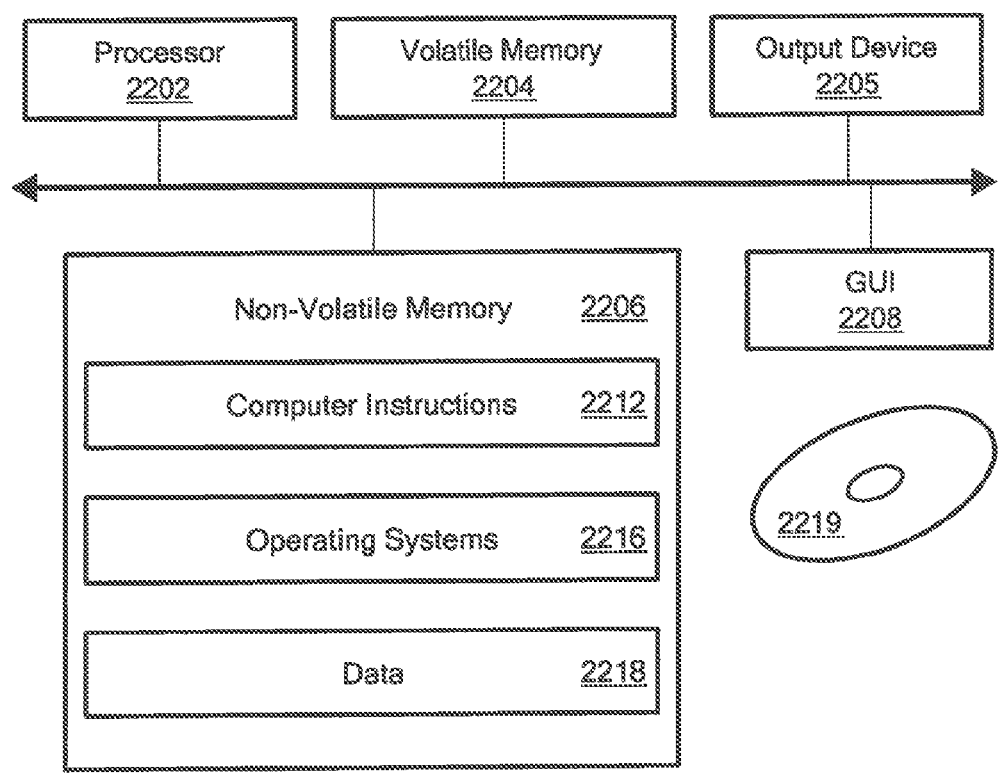
FIG. 22 is a schematic diagram showing an exemplary computer that can perform at least a portion of the processing described herein.

Referring to FIG. 22, a computer includes a processor 2202, a volatile memory 2204, an output device 2205, a non-volatile memory 2206 (e.g., hard disk), and a graphical user interface (GUI) 2208 (e.g., a mouse, a keyboard, a display, for example). The non-volatile memory 2206 stores computer instructions 2212, an operating system 2216 and data 2218, for example. In one example, the computer instructions 2212 are executed by the processor 2202 out of volatile memory 2204 to perform all or part of the processing described above. An article 2219 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
    receiving input from a user for selection of services in service offering, wherein the service offering includes a network configuration template, a storage configuration template, and a compute configuration template, with associations between the service offering, isolation zones, and the services;
    identifying isolation zones that are valid for a block for the user selected service(s);
    receiving input from the user for selection of one or more identified isolation zones in an isolation zone catalog having isolation zones each having at least one VSAN, VLAN, and identify pool;
    applying attributes of the isolation zones selected by the user to the user selected services;
    creating, using a computer processor, first and second services selected from the service offering by the user on a block having components including VSANs, network switches, servers, a virtualization management VLAN, identity pools, and storage;
    creating a first isolation zone for the first service and a second isolation zone for the second service to provide separation in the block having the first and second services, the first and second isolation zones providing isolation of the first and second services using first and second ones of the VSANs in the block are virtualized from a first one of the network switches in the block, and third and fourth ones of the VSANs in the block are virtualized from a second one of the network switches in the block; and
    receiving user input for at least a first one of the first and second VSANs,
    wherein paths for the first and second services from a first one of the servers in the block through the first and/or second network switches to storage common to the first and second services are unique with respect to each other such that a path to the common storage for the first service will not be used by the second service,
    wherein the first isolation zone comprises the first VSAN, the third VSAN, and a first VLAN, the second isolation zone comprises the second VSAN, the fourth VSAN, and the first VLAN, a third isolation zone comprises the second VSAN, the fourth VSAN, and a second VLAN, a first group of services includes the first service, a second group of services includes the second service, and a third group of services includes a third service, wherein the first and second groups of services have VSAN isolation and shared VLAN, the second and third groups of services have VLAN isolation and shared VSAN.

2. The method according to claim 1, wherein the input from the user includes values for the first and second VSANs.

3. The method according to claim 1, wherein the input from the user include a value for the virtualization management VLAN.

4. The method according to claim 1, further including applying the first isolation zone to a further service.

5. The method according to claim 1, further including determining a list of applicable blocks which contain the VSANs and VLANs used in the first isolation zone.

6. The method according to claim 1, further including determining isolation zones that are valid for the list of applicable blocks.

7. The method according to claim 1, further including validating connectivity between components in the block.

8. The method according to claim 1, further including receiving input from the user for the file storage VLAN in the first isolation zone.

9. The method according to claim 1, further including receiving input from the user for the identity pools in the first isolation zone.

10. The method according to claim 1, wherein the identity pools include UUID, WWPN, WWNN, MAC addresses, and/or IP pool.

11. A system, comprising:
    at least one processor;
    memory coupled to the at least one processor, the at least one processor and the memory configured to:
    receive input from a user for selection of services in service offering, wherein the service offering includes a network configuration template, a storage configuration template, and a compute configuration template, with associations between the service offering, isolation zones, and the services;
    identify isolation zones that are valid for a block for the user selected service(s);
    receive input from the user for selection of one or more identified isolation zones in an isolation zone catalog having isolation zones each having at least one VSAN, VLAN, and identify pool;
    apply attributes of the isolation zones selected by the user to the user selected services;

create first and second services selected from the service offering by the user on a block having components including VSANs, network switches, servers, a virtualization management VLAN, identity pools, and storage;

create a first isolation zone for the first service and a second isolation zone for the second service to provide separation in the block having the first and second services, the first and second isolation zones providing isolation of the first and second services using first and second ones of the VSANs in the block are virtualized from first one of the network switches in the block, and third and fourth ones of the VSANs in the block are virtualized from a second one of the network switches in the block; and receive user input for at least a first one of the first and second VSANs, wherein paths for the first and second services from a first one of the servers in the block through the first and/or second network switches to storage common to the first and second services are unique with respect to each other such that a path to the common storage for the first service will not be used by the second service, wherein the first isolation zone comprises the first VSAN, the third VSAN, and a first VLAN, the second isolation zone comprises the second VSAN, the fourth VSAN, and the first VLAN, a third isolation zone comprises the second VSAN, the fourth VSAN, and a second VLAN, a first group of services includes the first service, a second group of services includes the second service, and a third group of services includes a third service, wherein the first and second groups of services have VSAN isolation and shared VLAN, the second and third groups of services have VLAN isolation and shared VSAN.

12. An article, comprising:

a non-transitory computer readable medium comprising stored instructions that enable a machine to perform:

receiving input from a user for selection of services in service offering, wherein the service offering includes a network configuration template, a storage configuration template, and a compute configuration template, with associations between the service offering, isolation zones, and the services;

identifying isolation zones that are valid for a block for the user selected service(s);

receiving input from the user for selection of one or more identified isolation zones in an isolation zone catalog having isolation zones each having at least one VSAN, VLAN, and identify pool;

applying attributes of the isolation zones selected by the user to the user selected services;

creating, using a computer processor, first and second services selected from the service offering by the user on a block having components including VSANs, network switches, servers, a virtualization management VLAN, identity pools, and storage;

creating a first isolation zone for the first service and a second isolation zone for the second service to provide separation in the block having the first and second services, the first and second isolation zones providing isolation of the first and second services using first and second ones of the VSANs in the block are virtualized from a first one of the network switches in the block, and third and fourth ones of the VSANs in the block are virtualized from a second one of the network switches in the block; and receiving user input for at least a first one of the first and second VSANs, wherein paths for the first and second services from a first one of the servers in the block through the first and/or second network switches to storage common to the first and second services are unique with respect to each other such that a path to the common storage for the first service will not be used by the second service, wherein the first isolation zone comprises the first VSAN, the third VSAN, and a first VLAN, the second isolation zone comprises the second VSAN, the fourth VSAN, and the first VLAN, a third isolation zone comprises the second VSAN, the fourth VSAN, and a second VLAN, a first group of services includes the first service, a second group of services includes the second service, and a third group of services includes a third service, wherein the first and second groups of services have VSAN isolation and shared VLAN, the second and third groups of services have VLAN isolation and shared VSAN.

13. The article according to claim 12, wherein the input from the user includes values for the first and second VSANs.

14. The article according to claim 12, wherein the input from the user include a value for the virtualization management VLAN.

15. The article according to claim 12, further including instructions for applying the first isolation zone to a further service.

16. The article according to claim 12, further including instructions for determining a list of applicable blocks which contain the VSANs and VLANs used in the first isolation zone.

17. The article according to claim 12, further including instructions for determining isolation zones that are valid for the list of applicable blocks.

18. The article according to claim 12, further including instructions for validating connectivity between components in the block.

* * * * *